US011830042B2

(12) United States Patent
Saifee et al.

(10) Patent No.: US 11,830,042 B2
(45) Date of Patent: *Nov. 28, 2023

(54) SYSTEM ARCHITECTURE AND METHODS FOR ONLINE REAL-TIME AUCTIONS OF ADVERTISING INVENTORY

(71) Applicant: OpenX Technologies, Inc., Pasadena, CA (US)

(72) Inventors: Qasim Saifee, Pasadena, CA (US); Bin Shen, Pasadena, CA (US); Brian Schmidt, Pasadena, CA (US); Jarriett Robinson, Pasadena, CA (US); David Tannenbaum, Pasadena, CA (US); Vadim Telyatnikov, Pasadena, CA (US); Miki Rapoport, Glendale, CA (US)

(73) Assignee: OPENX TECHNOLOGIES, INC., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/694,247

(22) Filed: Mar. 14, 2022

(65) Prior Publication Data
US 2022/0270139 A1 Aug. 25, 2022

Related U.S. Application Data

(63) Continuation of application No. 15/143,612, filed on May 1, 2016, now Pat. No. 11,276,088, which is a
(Continued)

(51) Int. Cl.
*G06Q 30/0273* (2023.01)
*G06Q 30/0241* (2023.01)
*H04L 67/02* (2022.01)

(52) U.S. Cl.
CPC ..... *G06Q 30/0275* (2013.01); *G06Q 30/0277* (2013.01); *H04L 67/02* (2013.01)

(58) Field of Classification Search
CPC ............ G06Q 30/0275; G06Q 30/0277; H04L 67/02; H04L 67/62
See application file for complete search history.

(56) References Cited

U.S. PATENT DOCUMENTS 7,296,033 B1 11/2007 Lynch
8,255,285 B1 8/2012 Peretz et al.
(Continued)

FOREIGN PATENT DOCUMENTS

AU 2007325303 11/2012
WO 2008067303 6/2008
(Continued)

OTHER PUBLICATIONS

Aqeel, Waqar, Bhattacherjee, Debopam, Chandrasekaran, Balakrishnan, Godfrey, P. Brighten, Laughlin, Gregory, Maggs, Bruce, and Singla, Ankit. Untangling Header Bidding Lore. Apr. 2, 2020, p. 1-17. (Year: 2020).*
(Continued)

*Primary Examiner* — Marie P Brady
(74) *Attorney, Agent, or Firm* — PATENT LAW WORKS LLP

(57) ABSTRACT

System architecture and methods for enabling an online real-time auction (either server-side or client-side) of advertising inventory that works in conjunction with ad serving technologies. In some implementations, the system architecture facilitates multiple parallel requests from an end-user's browser client to multiple real-time bidders who respond with a bid and advertisement that are sent to an ad serving system to be compared with other statically priced advertisements and exchange demand to determine the win-
(Continued)

ning advertisements that will be displayed to the end-user. Data is aggregated for each bid and price limits are set based on the aggregations. In other implementations, all the bids from the multiple bidders are passed to the publisher for selection of a bid by the publisher.

20 Claims, 23 Drawing Sheets

Related U.S. Application Data continuation-in-part of application No. 14/461,265, filed on Aug. 15, 2014, now Pat. No. 9,990,656, and a continuation-in-part of application No. 14/461,186, filed on Aug. 15, 2014, now Pat. No. 10,614,490.

(60) Provisional application No. 61/866,998, filed on Aug. 16, 2013.

(56) References Cited

U.S. PATENT DOCUMENTS

| | | |
|---|---|---|
| 8,438,184 B1 | 5/2013 | Wang et al. |
| 8,983,860 B1 | 3/2015 | Beda, III et al. |
| 9,053,492 B1 | 6/2015 | Stanley et al. |
| 2003/0212648 A1 | 11/2003 | Cunningham et al. |
| 2007/0011050 A1 | 1/2007 | Klopf et al. |
| 2008/0097838 A1* | 4/2008 | Lin .................. G06Q 30/0247 705/14.46 |
| 2008/0162329 A1* | 7/2008 | Knapp ................ G06Q 40/04 705/37 |
| 2008/0288349 A1 | 11/2008 | Weisberg |
| 2009/0204541 A1 | 8/2009 | Zhuk et al. |
| 2009/0216642 A1 | 8/2009 | Ho et al. |
| 2009/0234713 A1 | 9/2009 | Bi et al. |
| 2010/0131373 A1 | 5/2010 | Kubasov |
| 2010/0145809 A1 | 6/2010 | Knapp et al. |
| 2010/0241511 A1 | 9/2010 | Cunningham et al. |
| 2011/0040636 A1 | 2/2011 | Simmons et al. |
| 2011/0173126 A1* | 7/2011 | Knapp .................. G06Q 30/02 705/14.71 |
| 2011/0185016 A1* | 7/2011 | Kandasamy ........... G06Q 10/06 709/203 |
| 2011/0191170 A1 | 8/2011 | Zhang et al. |
| 2011/0246297 A1 | 10/2011 | Buchalter et al. |
| 2011/0246298 A1 | 10/2011 | Williams et al. |
| 2011/0270689 A1 | 11/2011 | Klopf et al. |
| 2011/0282751 A1 | 11/2011 | Kwon et al. |
| 2012/0011019 A1 | 1/2012 | Wakim |
| 2012/0030034 A1 | 2/2012 | Knapp et al. |
| 2012/0036023 A1 | 2/2012 | Das et al. |
| 2012/0041816 A1 | 2/2012 | Buchalter |
| 2012/0136873 A1 | 5/2012 | Shaffer et al. |
| 2013/0036434 A1 | 2/2013 | Shkedi |
| 2013/0073401 A1 | 3/2013 | Cook |
| 2013/0080264 A1 | 3/2013 | Umeda |
| 2013/0124357 A1 | 5/2013 | He et al. |
| 2013/0138514 A1 | 5/2013 | Yan et al. |
| 2013/0163428 A1 | 6/2013 | Lee et al. |
| 2013/0191439 A1* | 7/2013 | Kern ..................... G06F 16/986 709/203 |
| 2013/0311301 A1 | 11/2013 | Grant et al. |
| 2013/0339126 A1 | 12/2013 | Cui et al. |
| 2013/0339139 A1 | 12/2013 | Meyers et al. |
| 2014/0033228 A1 | 1/2014 | Lucash |
| 2014/0095324 A1 | 4/2014 | Cabral et al. |
| 2014/0100944 A1 | 4/2014 | Zhu et al. |
| 2014/0188630 A1 | 7/2014 | Balazs et al. |
| 2014/0223462 A1 | 8/2014 | Aimone et al. |
| 2014/0278981 A1 | 9/2014 | Mersov et al. |
| 2014/0324603 A1* | 10/2014 | Savkar ................. H04N 21/812 705/14.71 |
| 2015/0019331 A1 | 1/2015 | Chambard et al. |
| 2015/0154650 A1 | 6/2015 | Umeda |

FOREIGN PATENT DOCUMENTS

| | | | |
|---|---|---|---|
| WO | 2011/041465 | 4/2011 | |
| WO | WO-2013148291 A1 * | 10/2013 | ............. G06Q 30/02 |

OTHER PUBLICATIONS

Scott Morton and Dineli, Roadmap for a Digital Advertising Monopolization Case Against Google, Omidar Network, May 2020, p. 1-41 (Year: 2020).*
PPachilakis M, Papadopoulos P, Markatos EP, Kourtellis N. No more chasing waterfalls: a measurement study of the header bidding ad-ecosystem. InProceedings of the Internet Measurement Conference Oct. 21, 2019 (pp. 280-293). (Year: 2019).*
"What Is Holistic Ad Serving?", Ad OPS Insider, Sep. 24, 2012. p. 1-11 (Year: 2012).*
Aqeel et al., "Untangling Header Bidding Lore," Apr. 2, 2020, pp. 1-17.
International Search Report and Written Opinion for International Application No. PCT/US2014/051376, dated Feb. 11, 2015, 17 pgs.
Morton et al., "Roadmap for a Digital Advertising Monopolization Case Against Google," Omidar Network, May 20, pp. 1-41.
Pachilakis et al., "No more chasing waterfalls: a measurement study of the header bidding ad-ecosystem," Proceedings of the Internet Measurement Conference, Oct. 21, 2019, pp. 280-293.
Sluis, "The Rise of 'Header Bidding' and the End of the Publisher Waterfall," AdExchanger, Jun. 18, 2015, 12 pgs.
Zawadzinski, "Ad serving insights: Ad invocation codes and placement tags," Clearcode Blog, Feb. 17, 2013, 11 pgs.
Cook, J. et al., "Inferring Tracker-Advertiser Relationships in the Online Advertising Ecosystem Using Header Bidding," Jul. 6, 2019, arXiv: 1907.07275, 2019—arxiv.org (2019), 1-18.
Qin, R., et al., "Optimizing the Revenue for Ad Exchanges in Header Bidding Advertising Markets," 2017 IEEE International Conference (2017) pp. 432-437.

* cited by examiner

SYSTEM ARCHITECTURE AND METHODS FOR ONLINE REAL-TIME AUCTIONS OF ADVERTISING INVENTORY

CROSS REFERENCE TO RELATED APPLICATIONS

This application is a continuation of U.S. application Ser. No. 15/143,612, titled "System Architecture and Methods for Online Real-Time Auctions of Advertising Inventory," filed on May 1, 2016, which is a continuation-in-part of U.S. application Ser. No. 14/461,265, titled "System Architecture and Methods for Facilitating Client-Side Real-Time Auctions of Advertising Inventory," filed on Aug. 15, 2014, which claims priority under 35 USC § 119(e) to U.S. Application No. 61/866,998, titled "System Architecture and Methods for Facilitating Client-Side Real-Time Auctions of Advertising Inventory," filed on Aug. 16, 2013, and U.S. application Ser. No. 15/143,612 is a continuation-in-part of U.S. application Ser. No. 14/461,186, titled "Integrated Architecture for Performing Online Advertising Allocations," filed on Aug. 15, 2014. The entireties of all of the above-referenced applications are herein incorporated by reference.

BACKGROUND

1. Field of the Invention

The present invention relates generally to the field of digital media display advertising. In particular, the present invention relates to system architecture and methods for platform configurations that facilitate server-side and client-side online real-time auctions of advertising inventory that may be operated by an exchange, a publisher, and/or a third party.

2. Description of the Related Art

With the popularity and use of the Internet, web browsers and sites providing content have grown dramatically over the past decade. With this growth there has been an equally dramatic growth and migration to online advertising. However, online advertising presents a complex eco-system involving complicated interplay between several entities, including online publishers (an example of a first-party entity), online advertisers (both, informed and uninformed, other examples of a first-party entity), and users (examples of first-party entities) who typically browse the internet or use mobile applications to view all types of content.

An advertisement displayed in the web content or on a mobile application is often in the form of an arbitrary string of HTML called a "creative." The advertisement is displayed by adding a "creative" to the current web page or application in which the advertisement is to be displayed in the appropriate location. In the simplest case, the creative may contain an image or "Flash" element representing what is ultimately visible to the user on his or her user device as the advertisement. In some instances, the creative may also represent code or the HTML for a third-party advertisement ("ad") tag.

In instances when a "creative" is added to the web page, a notification otherwise referred to as the "impression" is sent back to the advertisement server to confirm that the advertisement has been displayed. It should be recognized that the term "impression" also generally refers to the event in which a user views a slot into which an advertisement can be served, along with any contextual information that could inform the advertisement selection process. In such scenarios, "impressions" are what advertisers are ultimately interested in purchasing from web publishers.

Typically, digital advertising supply, or "inventory," refers to the impressions that website publishers have made available for advertisers to purchase. Impressions are eventually associated with advertisement units, which are the physical spaces on web pages or mobile applications reserved for displaying advertisements.

Online or digital advertising typically uses modeling platforms (examples of third-party entities) that use these impressions, impression values (intrinsic, i.e., value to an "advertiser" and value to a "publisher" of content), estimated impression values, and inventory of content. Impression values include intrinsic values, which are values to advertisers and publishers. Estimated impression values include values to publishers and advertisers (both informed and uninformed).

Because advertising on the internet has become a very large industry, advertisers are interested in targeting very specific individuals who are most likely to engage with their product. Advertisers are often looking to target specific users who match certain demographics and/or have visited certain websites or purchased specific items. In order to reach those specific users, advertisers utilize real-time bidders (third-party platforms) and exchanges (third-party platforms), which have access to large amounts of inventory so they can find those specific users. Presently most real-time bidders gain access to publisher inventory indirectly, through these exchanges or through server-side requests (examples of third-party platforms). The ability to make multiple requests to several real-time bidders directly from the client and have them compete with their other non-real-time inventory is beneficial to the publisher as it creates additional competition and accomplishes higher overall pricing for their inventory.

As a related consideration, several third-party platforms exist that provide advertisement software as a service and serve as ad servers. Some of these third-party ad server platforms are configured for use by small publishers and others are scaled for use by large publishers. Such third-party ad server platforms provide a myriad features to provide ad-management solutions that help publishers either sell, schedule, deliver, or measure their digital ad inventory, and optimize their revenue. In operations of third-party platforms, a webmaster typically inserts a tag or code into a webpage. In some instances, each time this page is visited, the code calls an advertisement server, which delivers an advertisement from its source of vendors. In some instances, the code may create an IFrame, and then the third-party platform determines which campaign wins and then delivers the creative (one or a group of creatives) to the IFrame. In many instances, inline JavaScript tags are used instead. Such platforms enable growing publishers to operate quickly, while providing access to a sophisticated feature set to manage and deliver advertising across a publisher's web, mobile, and video ad inventory.

In one example scenario, a publisher may define its advertisement inventory to a third-party ad server. For example, the platform may take a publisher's home page and cut out all of the advertisement space. These empty spaces that are identified define the publisher's advertisement inventory and represent what the publisher can sell to advertisers. Ad servers permit the publisher to sell the ad inventory directly to advertisers, by confirming the number of advertisement impressions or clicks that are available to sell. These third-party platforms also offer inventory forecasting. Using these third-party platforms, publishers can manage their own campaigns and in the event advertisers have specific campaign goals, add in, additional delivery and targeting options such as geography, day and time, or custom targeting criteria that is defined by the publishers. For any inventory that is not sold by the publisher, the platform may utilize tools to ensure that the publisher always has an opportunity to earn the most revenue from its content. After uploading "creative" (for example, either one or a group of "creatives"), the platform delivers a publisher's ads. The platform may be configured with infrastructure and intelligent ad-delivery engines to help ensure that campaigns deliver on schedule and meet their campaign goals. Once a particular publisher's advertisements start delivering, a particular publisher may monitor their performance with ease.

There are other ad server platforms that provide other features including a single interface to track all activities, eliminating the frustrations typically experienced by publishers who have to toggle back and forth between different systems. These platforms can track multiple campaigns for multiple clients across multiple digital marketing channels through a single, powerful gateway. A publisher may obtain real-time statistics on campaign performance, from clicks to conversions, e-commerce sales, and more. Such platforms are configured to partner with other ad platforms and networks. These platforms offer a more reliable infrastructure, a flexible API, custom solutions, and consulting services. Some ad servers interface with one or more ad exchanges that allow publishers seamlessly to manage their inventory, and sell the inventory directly through the associated ad exchange. A publisher, however, cannot know whether the prices bid by advertisers in such an associated ad exchange is the highest and best price available for any given ad impression. If publishers could accurately assess the market value of an impression before sending the impression to an ad exchange associated with their ad server, they could use such information to set a minimum price for bids in the associated ad exchange, thereby ensuring that they receive the highest and best price for each impression.

Therefore, a need continues to exist in the art for better systems and methods configured to provide better solutions and increased revenue.

SUMMARY

The present invention overcomes the deficiencies and limitations of prior systems and methods, at least in part by, providing a system and methods with innovative architecture that is configured to enable or operate a client-side auction with several real-time bidders before the system communicates with an advertisement exchange associated with their ad server. In some implementations, the results of the client-side auction are then communicated to the ad-serving system using key/value pairs and campaign targeting so that the ad-serving system can operate its own auction between the real-time bidders and the non-real time inventory. By soliciting bids from one or more third party sources, publishers can evaluate the market value of a given ad impression before delivering it to an ad exchange associated with their ad server. By using this value as a minimum price that the publisher will accept, bidders in the associated ad exchange are required to exceed the minimum price in order to win the right to have their ad delivered. This system ensures accurate and competitive pricing and bidding for a publisher's inventory, thereby increasing the publisher's revenue and yield.

In some innovative implementations, a publisher may send a request to one or more third parties, including ad exchanges where a real-time auction results in a winning bid, or demand side platforms, ad networks, or other sources of potential demand for ad impressions. In advance, the third-party platforms may have set up campaigns for a range of prices. A publisher may then use the prices such demand sources are willing to pay as a minimum price delivered to another ad exchange. In many implementations, these initial auctions or expressions of price interest may result in a higher price to the publisher as multiple parties bid on the request. This integrated architecture for multiple third-party platforms creates a more competitive market for each request, resulting in increased revenue for publishers.

The method according to some embodiments of the present invention comprise: (i) an end-user visiting a web page wherein multiple advertisements are displayed, (ii) for each ad unit on the page, multiple parallel requests are sent from the end-user's browser client to multiple real-time bidders who respond with a bid & advertisement for each unit, (iii) the bids are compared within the end-user's browser and the winning bid is sent to an ad serving system to be compared with other statically priced advertisements and exchange demand to determine the winning advertisements that will be displayed to the end-user and (iv) data is aggregated for each bid and price limits are set based on the aggregations.

In some innovative implementations, a zero latency or low-latency bidder feature enables pricing without delay, so the request to the publisher's ad server is not delayed. This feature uses local storage on the client side to cache advertisements on the client side. On the server side, the zero-latency feature has a masking engine configured to mask the domain URL sent as part of the bid request.

In some innovative implementations, the system architecture includes an enhanced server-side solution that allows publishers to solicit pricing from multiple exchange platforms and pass them into their primary ad server to participate in its ad selection logic. By this enhanced server-side solution, the real time bidding platform serves as a messaging protocol, without actually conducting and clearing an auction. The enhanced server-side solution integrates the header bidding technology with the publisher's ad server. With this configuration, publishers may add, pause, or remove exchange platforms without making any changes on their webpages. Moreover, demand partners may integrate with this enhanced server, providing the open real-time bidding industry standard for real-time bidding interface.

Other innovative aspects include corresponding methods, systems, apparatus, and computer program products for the above aspects as well as others described below.

BRIEF DESCRIPTION OF THE DRAWINGS

The present invention is illustrated by way of example, and not by way of limitation in the figures of the accompanying drawings in which like reference numerals are used to refer to the same or similar elements.

Figure 1:
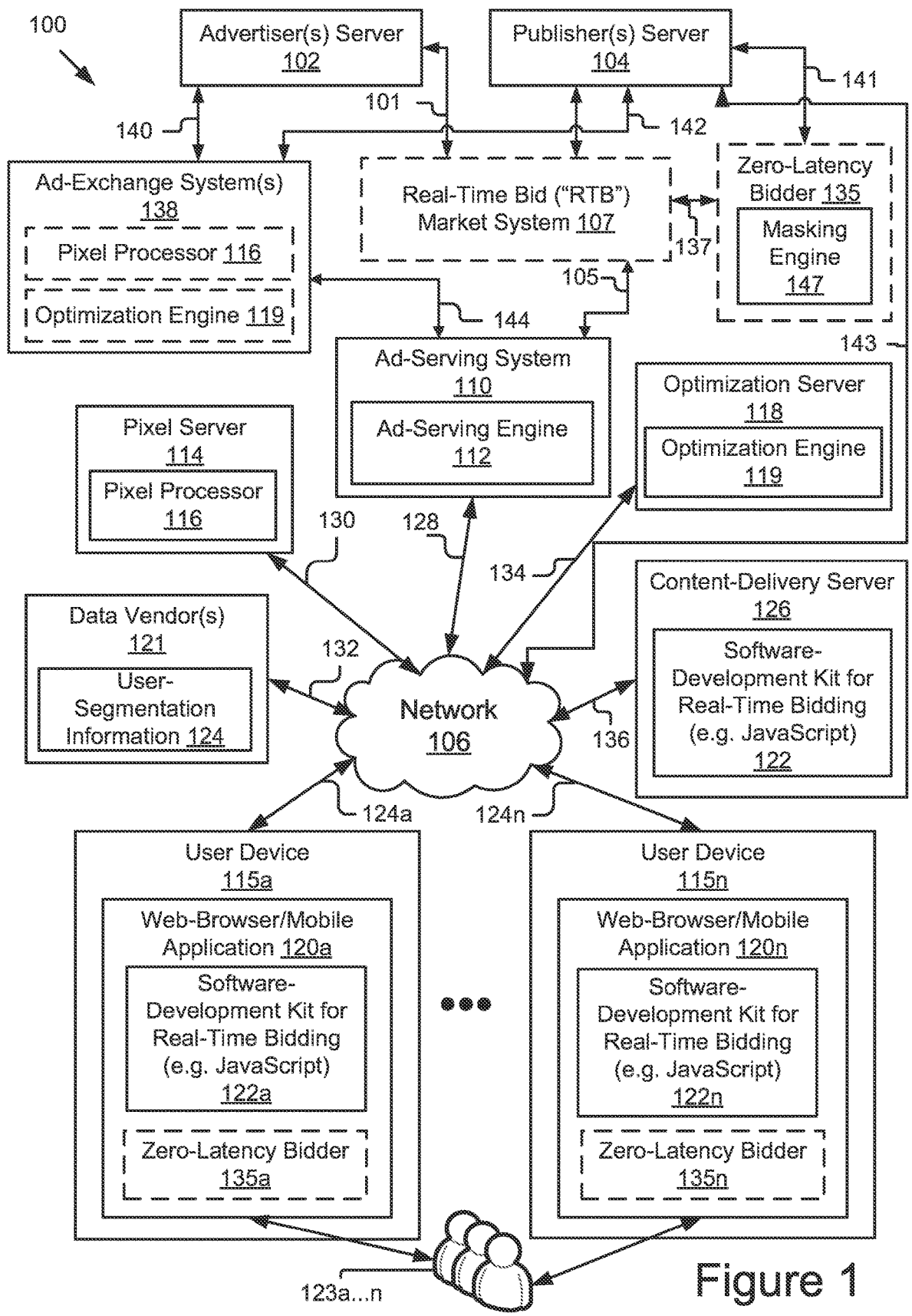
FIG. 1 illustrates a block diagram of an example real-time, online, auction network architecture (client-side and server-side technology) in accordance with some embodiments of the present invention.

It is to be understood that the attached drawings are for purposes of illustrating the concepts of the invention and may not be to scale, and are not intended to be limiting in terms of the range of possible shapes and/or proportions.

DETAILED DESCRIPTION

A system architecture and methods configured to enable or operate a client-side auction with several real-time bidders before the system communicates with, for example, places a call to an advertisement exchange. In some implementations, the results of the client-side auction are then communicated to the ad-serving system using key/value pairs and campaign targeting so that the ad-serving system can operate its own auction between the real-time bidders and the non-real time inventory.

In some implementations, a publisher may send a request to a third-party market platform, where a first real-time auction results in a winning bid. Before this winning advertisement ("ad") is served, that price may be sent to one or more other third-party platforms (also configured to perform other real-time auctions, a second, third, and so on). In advance, the third-party platforms may have set up campaigns for a range of prices. In many implementations, these additonal auctions may result in a higher price to the publisher as parties within these other third-party platform also bid on the request. This integrated architecture for multiple third-party platforms creates a more competitive market for each request, resulting in increased revenue for publishers.

In some implementations, another layer to the architecture may include a server-side container solution for header bidding. Publishers use multiple header bidding partners to maximize their competition and yield, yet this brings operational and technical complexities. Browser-side container solutions rely on multiple calls from a browser in a client device, which limits the page load speed and negatively impacts user experience. The server-side container solution allows a publisher to integrate, lauch, and manage multiple partners, while maintaining a positive user experience and interface and maximizing revenue. By this technology, publishers can manage multiple header bidding partners through a single integration point. By this container technology, by which data is transferred from a user's browser to the operating server (either operated by an exchange, publisher, or third-party), faster connections are enabled and multiple calls from a client browser are reduced to a single call to a server. Each publisher or header bidding partner in the advertising environment can integrate or receive information, and respond with a bid through industry-standard open real-time bidding protocols. A publisher can easily add, remove, or pause any header bidding partners with ease to enhance user experience. All bids that are received are passed by this technology to the publisher's ad server, making the flow and bidding operations transparent to the publisher and all the header bidding partners, to ensure an environment that facilitates fair dealing and pricing. This technology provides a more simple technical environment and platform architecture, in which a serve-side call eliminates the technical complexity associated with multiple header bidding partners interacting on a web page. In some implementations, by this technology, the cost of integrating with another header bidder is not borne by the publisher, because the other partners have already been integrated with the exchange platform or open real-time bidding operations, and they are available to a publisher instantly. The publisher may need to address configuration of line items in the publisher ad server.

In the following description, for purposes of explanation, numerous specific details are set forth in order to provide a thorough understanding of this technology. It will be apparent, however, that this technology can be practiced without some of these specific details. In other instances, structures and devices are shown in block diagram form in order to avoid obscuring the innovative aspects. For example, the present technology is described in some implementations below with reference to particular hardware and software.

Reference in the specification to "one implementation or embodiment" or "an implementation or embodiment" simply means that a particular feature, structure, or characteristic described in connection with the implementation or embodiment is included in at least one implementation or embodiment of the technology described. The appearances of the phrase "in one implementation or embodiment" in various places in the specification are not necessarily all referring to the same implementation or embodiment.

Some portions of the detailed descriptions that follow are presented in terms of algorithms and symbolic representations of operations on data bits within a computer memory. These algorithmic descriptions and representations are the means used by those knowledgeable in the data processing arts to most effectively convey the substance of their work to others in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present technology also relates to an apparatus for performing the operations described. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The present technology can take the form of an entirely hardware embodiment, an entirely software embodiment or an implementation containing both hardware and software elements. In some implementations, this technology is implemented in software, which includes but is not limited to, firmware, resident software, microcode, etc.

Furthermore, this technology can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times, code must be retrieved from bulk storage during execution.

Input/output or I/O devices (including but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented here are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein.

Each computer in the system may include one or more input and output (I/O) unit, a memory system, and one or more processing units. The "I/O" units of each computer may be connected to various input/output devices, such as a mouse, keyboard, video card (video monitor), sound card (with speakers), network card, and printer. The memory system in a typical general purpose computer system usually includes a computer readable and writeable nonvolatile recording medium, of which a magnetic disk, a flash memory and tape are examples. The memory system operably holds the operating system, utilities, and application programs. It should also be understood the invention is not limited to the particular input devices, output devices, or memory systems used in combination with the computer system or to those described herein. Nor should the invention be limited to any particular computer platform, processor, or high-level programming language.

System Overview

According to some embodiments of the present invention, system architecture for conducting real-time auctions is illustrated. For purposes of the description, some definitions are provided here. A "pixel" refers to a 1×1 pixel image file in any standard browser image format (e.g., gif, jpg, png). A "web worker" refers to an HTML five threaded process that runs asynchronously and can pass messages/events back to main page. A key/value pair refers to data expressed as a tuple <attribute name, value>. For example: <david, male>. "Segmentation data" refers to data describing a user's demographics and preferences used for targeting advertisements.

For example, considering a user's gender, income level, etc. "JSON" (JavaScript Object Notation) means a lightweight text-based open standard designed for human-readable data interchange. It is derived from the JavaScript scripting language for representing simple data structures, called objects.

Referring now to FIG. 1, the system architecture illustrated includes an Advertiser(s) Server 102, a Publisher(s) Server 104, Real-Time Bid Market System 107 (shown in broken lines as it may be optional in some embodiments), a Zero-Latency Bidder 135 (shown in broken lines as it may be optional in some embodiments), a Pixel Server 114 (with an pixel processor 116), an Ad Serving System 110 (with an Ad Serving Engine 112), an Optimization Server 118 (with an Optimization Engine 119), Data Vendor(s) 121 (with User Segmentation Information 124), a Content Delivery Server 126 (with code or script, e.g., JavaScript for Real-Time Bidding 127), one or more Ad Exchange Systems 138, and a plurality of user devices 115a through 115n, each with a web browser/mobile application 120a through 120n (and the Software Development Kit (SDK) for Real-Time Bidding 122a through 122n and the zero-latency bidder component 135a through 135n).

The advertiser server 102 may be an online or digital advertiser server or website 102 (representing one or more online or digital advertisers). In the context of the present disclosure, an advertiser is any individual, group of people, company, or any other enterprise, that desires to have advertisements embedded in the content of other publishers. The online or digital advertiser server 102 may be a computing system (with one or more computers or processors, either linked or distributed) that submits bids to the Real-Time Bid ("RTB") Market Platform 107 (shown in broken lines as in some advertising scenarios this may be omitted or the functionalities may be incorporated in other platforms) to purchase publisher inventory and have advertiser advertisements shown on the publisher's website. The online or digital advertiser server 102 is illustrated as coupled to the RTB market platform 107 via signal line 101 and the online or digital publisher content server 104 is illustrated as coupled to the RTB market platform 107 via signal line 103. In some embodiments, the computing system may comprise one or more processors coupled in a distributed environment or otherwise to execute operational functionalities associated with the Advertiser(s) servers.

The online or digital publisher content server 104 may be a computing system that maintains online or digital content that attracts users and contains placeholders for advertisements (from the advertisement inventory) that are submitted to the RTB market system 107, for sale to advertisers. A content publisher that places content on publisher content server 104 may be an individual, a group of people, a company, or any other enterprise that owns or controls content that is made accessible for viewing via the publisher content server 104. A content publisher utilizes the publisher content server to serve content (e.g., web pages) to the user devices 115a through 115n of an Internet user. For instance, in some embodiments, the publisher content server 104 is a web server or application server that serves Internet documents or web pages encoded in a mark-up language (e.g., HTML) that can be rendered by the web browser 120a through 120n application executing on the user devices 115a through 115n, for display to an Internet user. Accordingly, the web pages served by the publisher server 104 may be thought of as the publisher's inventory. Each time a web page is served, an opportunity exists to display one or more advertisements embedded within the web page. Skilled artisans generally refer to this opportunity, that is, the presentation of a web page with a display advertisement, as a page impression, or simply an impression. Accordingly, the terms "ad space" and "impression" are often used synonymously with the term "inventory" to indicate what it is that is being offered for sale or viewing by the publisher.

The RTB Market System 107 may be a computing system that provides a real-time bidding market that allows advertisers to bid on publisher inventory in real-time. While only a single advertiser server 102, a single publisher content server 104 and a single network 106 are shown in FIG. 1, it should be recognized that there may be thousands or even millions of advertiser servers 102, publisher content servers 104, or networks 106 interconnected in complex architecture configurations to execute the operations and functionalities described here. FIG. 1 is merely provided as one example illustration of the Advertiser (s) Server 102, Publisher(s) Server 104, and Network 106, which present the environment in which the present technology may be implemented.

The Advertiser(s) Server 102 is coupled by signal line 101 for communication with the Real-Time Bid Market System 107. Although not explicitly shown in FIG. 1, it should be recognized that any and all the signal lines illustrated in FIG. 1 may route, via the network 106, as illustrated in FIG. 1. The Advertiser(s) Server 102 is coupled to the Real-Time Bid Market System 107 to send bids on impressions, and also provides advertisement content, advertising target information, price, or any other information related to the impression or necessary to serve the advertisement. The RTB Market System 107 illustrates a real-time bidding market environment, which allows advertisers to bid on publisher inventory in real-time.

The online Publisher Server or content site 104 is a computing device for hosting a website with any type of content for publishing. The signal line 103 provides information to the RTB Market System 107 about which impressions on the publisher's site are available for the RTB Market System 107. The bi-directional signals line 102 and 103 (from the RTB 107) to the Advertiser(s) Server 102 and Publisher(s) Server 104 represent the flow of data.

The RTB Market System 107 is coupled by signal line 105 to an Ad Serving System 110, which is configured to serve the advertisements. The advertisement server 110 may be hardware and software that receives requests for advertisement units, submits, and then fulfills those requests with online content. The advertisement server 110 is coupled to the Network 106 for communication and interaction with the Advertiser Server(s) 102 and/or the Publisher(s) Server 104. In some embodiments, the Ad Serving System 110 is also coupled to interact directly with the user devices 115a-115n as depicted in FIG. 1, by signals lines 128 and 124a (connecting the Ad Serving System 110 to the User Device 115a) through signal lines 128 and 124n (connecting the Ad Serving System 110 to the user device 115n). The Ad Serving System 110 is coupled to one or more Ad Exchange Systems 138 via line 144. And, the one or more Ad Exchanges are coupled to the Ad Server(s) 102 via line 140. In some implementations, the Ad Serving System 110 may send the bid(s) to the one or more Ad Exchanges 138 for further processing. An Ad Exchange 138 may be hardware and software that receives the bids and further processes them as described in the flow charts below. Each of the one or more Ad Exchange Systems 138 may include the Optimization Engine 119 and Pixel Processor 116 to carry out the functionalities as described here.

The zero-latency bidder 135 is show in broken lines as it may be optionally used with the systems described here. The zero-latency bidder 135 is bi-directionally coupled to the publisher(s) server 104 by line 141 and the Real-Time Bid (RTB) Market system 107 by line 137. The zero-latency bidder 135 includes a masking engine 147 and operates with zero-latency bidder features (optional) designated by reference numerals 135a through 135n, in the user devices 115a through 115n. The zero-latency bidder features may be used to significantly improve bidder participation rate as close to 100% as possible and create a superior user experience with low to no latency. These features cache bids that do not translate into impressions for subsequent ad requests. The zero-latency bidder enables publishers to cache bids inside web storage to use on subsequent ad requests to reduce latency. By the masking engine 147, the page URL may be masked to conceal the site domain to prevent incorrect information from flowing to buyers. A publisher may always pull auction results from the web storage queue by price order. The market operator may purge the auction results that are older than 5 minutes from the user's web storage. The publisher may configure the maximum auction results to remain in the web storage queue per ad size for the publisher site. The publisher may easily refill the web storage queue every time an impression is served. The publisher may refresh the web storage queue if it loses to Ad Server/Ad Exchange (e.g., DFP/AdX) a predetermined number of times. The masking engine 137 is configured to automatically apply a domain override to only show the domain in "URL" and "http_referrer" fields in bid requests.

The Network 106 may be of a conventional type, wired or wireless, and may have any number of configurations such as a star configuration, token ring configuration or other configurations known to those skilled in the art. Furthermore, the network 106 may comprise a local area network (LAN), a wide area network (WAN) (e.g., the Internet), and/or any other interconnected data path across which multiple devices may communicate. In yet another embodiment, the network 106 may be a peer-to-peer network. The network 106 may also be coupled to or includes portions of a telecommunications network for sending data in a variety of different communication protocols. In yet another embodiment, the network 106 includes Bluetooth communication networks or a cellular communications network for sending and receiving data such as via short messaging service (SMS), multimedia messaging service (MMS), hypertext transfer protocol (HTTP), direct data connection, WAP, email, etc.

The Pixel Server 114 with Pixel Processor 116 delivers pixel image files in any standard browser image format (e.g., gif, jpg, png). The pixel processor 116 aggregates this data for reporting and for price threshold analysis. The Optimization Server 118 with Optimization Engine 119 takes this data and determines minimum pricing thresholds and writes this to the JavaScript code that is downloaded by the client at the beginning of the process. Data Vendor(s) 121 may provide User Segmentation Information 124 and Content Delivery Server 126 may provide the JavaScript (for web browsers) and software development kits (SDKs for mobile devices) for Real-Time Bidding.

The client (alternatively referred to as a consumer, user, or viewer) device, referenced in the drawings as User Device 115a is representative of client devices 115a-115n and is a conventional type of computing device, for example, a personal computer, a hardware server, a laptop computer, a tablet computer, or smart phone. The User Devices 115a-115n, are illustrated, as coupled to the network 106. In one embodiment, the User Device 115 (e.g., 115a) is coupled to receive online advertisements from the Advertisement Serving System 110 directly and/or receive content from publishing sites such as the Publisher(s) Server 104 via the network 106. The User Device or client device 115 (e.g., 115a) includes a web browser or mobile application 120a for presenting online content and advertisements to a user (123a-123n) using any of the user devices 115a through 115n. The web browser or mobile application 120a is configured to provide access to a hosted web page. The web page may comprise a main area in which content is displayed and an advertisement. In some instances, the advertisement may be contained within an iframe or other means as used in the online advertising industry. The User Device or client device 115 (e.g., 115a) may also contain a zero-latency bidder 135a, shown in broken lines as it is optional. All the User Devices 115 (115a-115n) may have the zero-latency bidder 135a-135n. The operations of the zero-latency bidder 135a-135n are described in greater detail later in this application.

As illustrated in FIG. 1, the web browser 120a may include scripts configured to perform the functionalities. In some implementations, a JavaScript configured for Real-Time Bidding 122a may be located in the browser (or mobile application) 120a through 120n. The JavaScript 122a through 122n may be configured to facilitate Real-Time bidding by clients.

In one example, an end-user (e.g., client) may visit a website located at a specific URL using an internet browser 120a, such as Internet Explorer or Mozilla Firefox. The browser 120a renders HTML (Hypertext markup language) code that requests a JavaScript file 122a be loaded from a content delivery network. The JavaScript file 122a contains code that enables multiple parallel requests to be made to several real-time bidders for each advertisement slot on a web page. The JavaScript code 122a is configured to prevent continuous loading of the advertisements on the web page until either a certain time has elapsed or until all the bidders have responded. The JavaScript code 122a then determines the winning bid for each advertisement slot. In some instances, the JavaScript code 122a may also be configured to contain historical pricing information by number of requests for each advertisement slot and for particular user segments as determined by the Data Vendors 121. In some implementations, the winning bid may be compared against these historical values to determine if it reaches a minimum threshold. In scenarios where the threshold is met, a key/value pair is set for each winning bid that is sent to the Ad Serving System 110. The Ad Serving System 110 contains many campaigns targeted to key/values pairs to run the real-time advertisements. The Ad Serving System 110 determines if the winning bid generated from the real-time auction wins against fixed priced inventory. If the real-time bidder wins, then code is written to the web page to display the real-time winning bid advertisement.

In some implementations a pixel may be written to the web page that calls the Pixel Server 114. Appended to the pixel is information pertaining to the number of requests the user made to reach the bid and more detailed information about the user as determined by the Data Vendor(s) 121. The Pixel Processor 116 aggregates this data for reporting and for price threshold analysis. In some implementations, the Optimization Engine 119 takes this data and determines minimum pricing thresholds and writes this to the JavaScript code 122a that may be downloaded by the user or client at the beginning of the process.

Figure 2A:
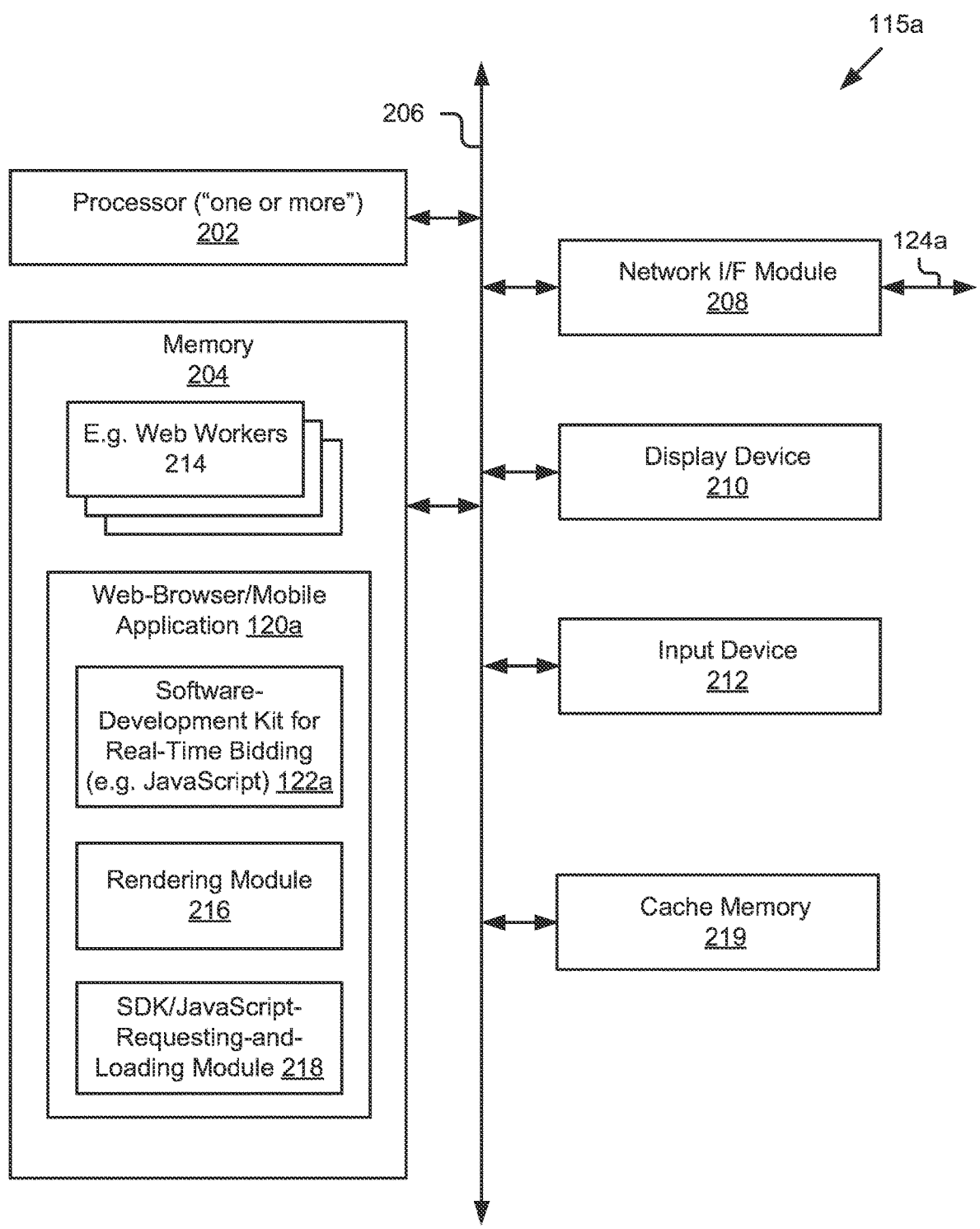
FIG. 2A illustrates a block diagram of an example client (or consumer or user) device configuration to facilitate real time bidding in accordance with some embodiments of the present invention.

Referring now to FIG. 2A, the user device (any of 115a through 115n) may be a conventional computer, for example, a personal computer that is used to represent a conventional type of mobile computing device, for example, cellular telephones, tablet devices, or wearable devices, each using a computing device or a computing device connected to an actual mobile device. The user devices 115a-115n, are coupled to the network 106 (e.g., an ad network) by signal lines 124a-124n (FIG. 1), respectively. In one embodiment, the user device 115a is coupled to receive (e.g., download or otherwise view) content with online advertisements from the Advertiser(s) server 102 and other content from publishing sites (e.g., Publisher Server(s)) or third party servers (not shown) coupled in the illustrated distributed environment.

The user device 115a through 115n may comprise a processor or one or more processors, indicated by reference numeral 202, a memory 204, a network I/F module 208, a display device 210, and an input device 212. The user devices 115a through 115n include the web browser (or mobile application) 120a (in the Memory 204) for presenting web pages including online content and advertisements to the user, consumer, or client for viewing on their respective user devices 115a-115n. The web browser 120a on each of the user devices 115a-115n presents advertisements and other online content, and receives input from the user as represented by signal lines 124a-n. Users may interact via their respective devices 115a-115n (e.g., for viewing or manipulating tools to receive or control viewing of the online content). The web browser 120a-n and the software development kit (SDK) or scripts resident on the user devices 115a-115n are operable on the user devices 115a through 115n. In some implementations, the scripts may include a JavaSript for Real-Time Bidding 122a. The web browser 120a (through 120n) may also include a Rendering Module 216 and a JavaScript (or SDK) Requesting and Loading Module 218.

The Processor 202 processes data signals and program instructions received from the Memory 204. The processor 202 may comprise various computing architectures including a complex instruction set computer (CISC) architecture, a reduced instruction set computer (RISC) architecture, or an architecture implementing a combination of instruction sets.

The memory 204 is non-transitory storage medium. The memory 204 stores the instructions and/or data which may be executed by the processor 202. In some embodiments, the instructions and/or data stored on the memory 204 comprises code for performing any and/or all of the techniques described herein. The memory 204 may be a dynamic random access memory (DRAM) device, a static random access memory (SRAM) device, flash memory or some other memory device known in the art. The memory 204 includes the web browser 120a including various scripts that enhance the functionality of the client-side bidding operations. In some implementations, the memory stores the web browser 120 with the JavaScript (or SDK) for real-time bidding indicated by reference numeral 122a. In some implementations, the memory 204 stores the web browser 120a with the JavaScript for implementing the real-time bidding operations. In some implementations, the memory 204 stores the web browser 120a with the JavaScript for conducting the real-time bidding operations.

The network I/F module 208 facilitates the communication between the user device 115a and the servers via the network 106. A user, via the user device 115a, communicates with the other servers in the system 100 (FIG. 1) via the network I/F module 208.

The display device 210 displays the content or web pages that a particular user is viewing and the input device 212 serves as the input to the display device 210. The cache memory 219 is coupled to the processor 202. The cache memory is a random access memory (RAM) that the processor 202 may access more quickly than it can access regular RAM. This cache memory is typically integrated directly with the processor chip or may be on a separate chip that has a separate bus interconnect with the processor 202. The cache memory 219 is used to reduce the average time to access data from the main memory 204. The cache is a smaller and faster memory, which stores the program instructions that are frequently referenced by the software during operation. Fast access to these instructions increases the overall speed of the software program. In operation, as the processor 202 processes data, it looks first in the cache memory for instructions and if it finds the instructions there (from a previous reading of the data), it does not conduct a more time consuming reading of data from the larger memory or other data storage devices. In some instances, multi-tier or multilevel caching, with different levels providing greater efficiency may also be used.

According to an embodiment of the present invention and referring to FIGS. 1 and 2A together, an end-user (e.g. via User Device 115a) visits a web page with one or more ad units on the page. In some implementations, JavaScript is loaded on the page that spawns multiple iframes or web workers 214 or alternative mechanisms (FIG. 2A) that make parallel requests to several real-time bidders. The web page pauses loading of advertisements for a configured amount of time, for example milliseconds or in some instances until all bids are received. After time has elapsed or all bidders have responded, the winner is determined. In some implementations, the winning bid is compared against price floors by segment and sent to the ad server (e.g., Ad Serving System 110). The price floors are determined by analyzing the segmentation data along with each bid and storing the mean value of the bid minus a standard deviation in a JSON array that gets downloaded by the client and compared to the winning bid.

Figure 2B:
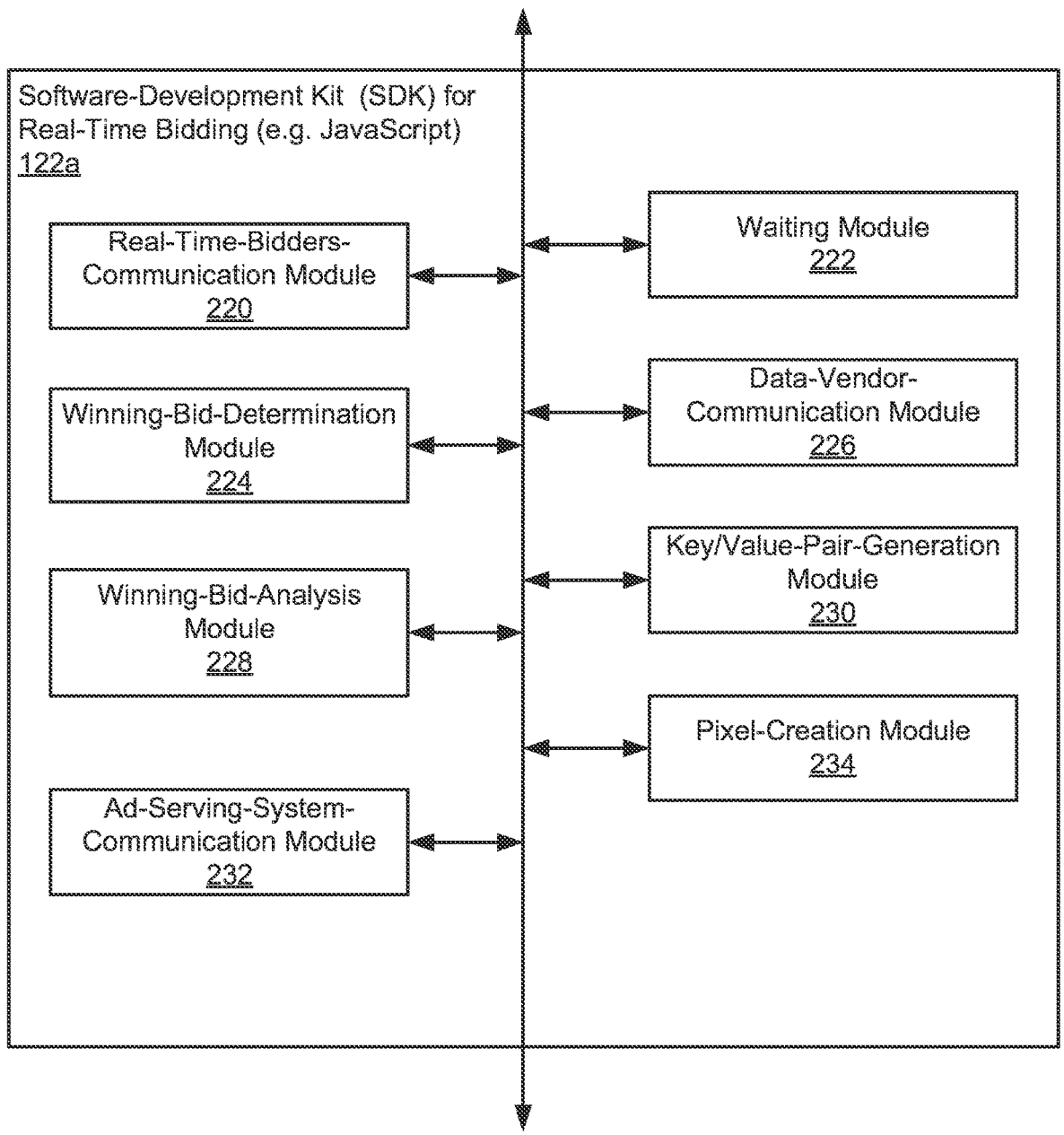
FIG. 2B illustrates a block diagram of example code (e.g., a software development kit (SDK), e.g., JavaScript) provided by the content delivery server to facilitate the real time bidding in accordance with one embodiment, including determination of a winning bid.

Referring now to FIG. 2B, the Software Development Kit (e.g. JavaScript) for Real-Time Bidding 122a includes various example modules, including hardware and/or software as illustrated in the figures, which are described here. The SDK or JavaScript for Real-Time Bidding 122a includes a Real-Time-Bidders-Communication Module 220, a Waiting Module 222, a Winning-Bid-Determination Module 224, a Data-Vendor-Communication Module 226, a Winning-Bid-Analysis Module 228, a Key/Value Pair Generation Module 230, an Ad-Serving-System-Communication Module 232, and a Pixel-Creation Module 234. The Real-Time-Bidders-Communication Module 220 may be code or routines for communicating the bids in real time from bidders. In some implementations, the Waiting Module 222 may be code or routines for designating time limits for waiting. A Winning-Bid-Determination Module 224 may be code or routines for determining a winning bid in a winning bid embodiment. A Data-Vendor-Communication Module 226 may be code or routines for communicating data with a particular vendor. A Winning-Bid-Analysis Module 228 may be code or routines for conducting analysis relating to a winning bid. A Key/Value Pair Generation Module 230 may be code or routines for generating Key/Value pairs. An Ad-Serving-System-Communication Module 232 may be code or routines for communicating with the Ad Server. A Pixel-Creation Module 234 may be code or routines for creating pixels.

Figure 2C:
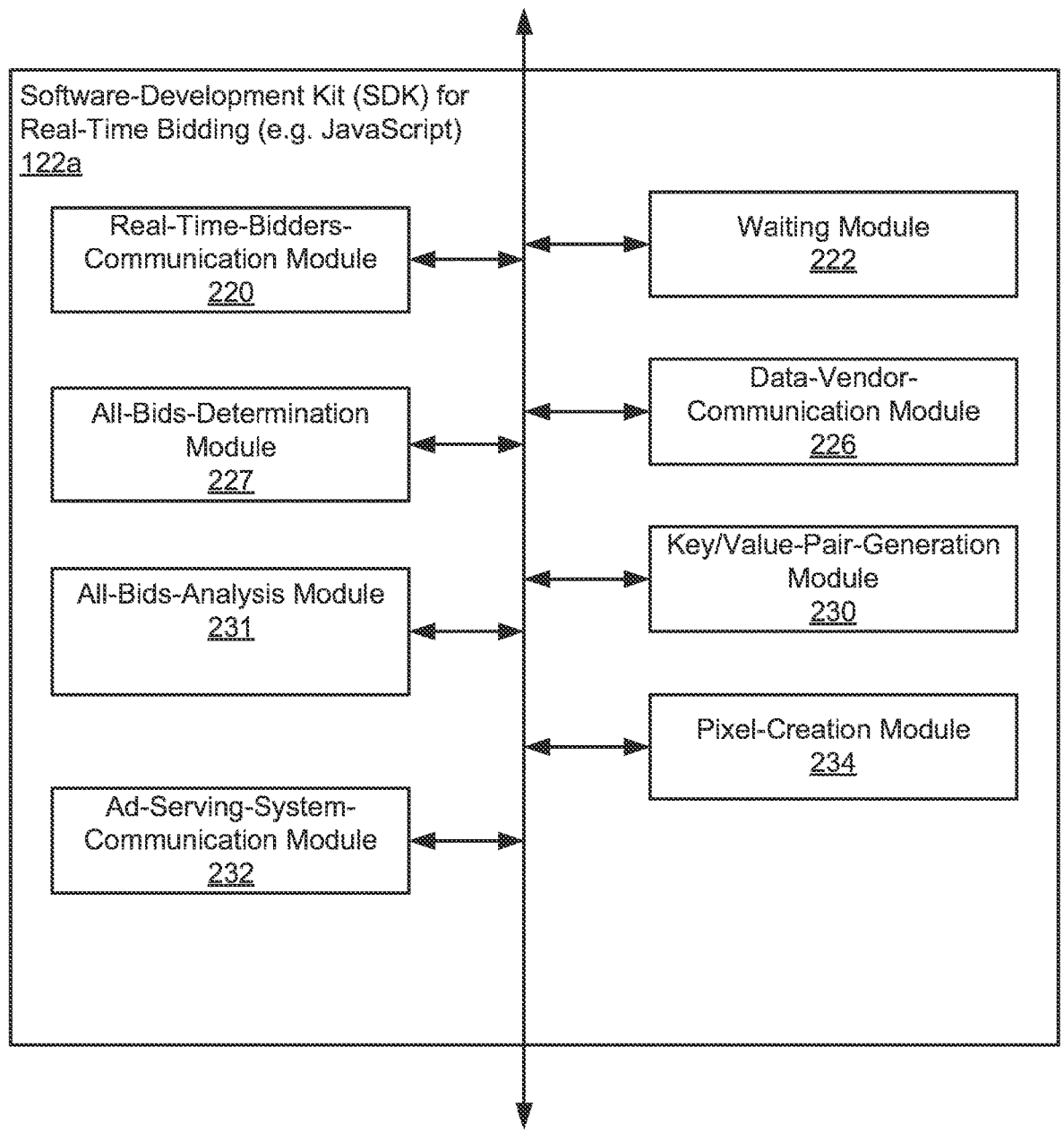
FIG. 2C illustrates a block diagram of example code (e.g., a software development kit (SDK), e.g., JavaScript) provided by the content delivery server to facilitate the real time bidding in accordance with another embodiment, including determination of all bids that are passed to the publisher, e.g., for selection of a bid by the publisher.

Referring now to FIG. 2C, the Software Development Kit (e.g. JavaScript) for Real-Time Bidding 122a includes various modules, among which examples of some modules are described here. The SDK or JavaScript for Real-Time Bidding 122a includes a Real-Time Bidders-Communication Module 220, a Waiting Module 222, an All-Bids-Determination Module 227, a Data-Vendor-Communication Module 226, an All-Bids-Analysis Module 231, a Key/Value Pair Generation Module 230, an Ad-Serving-System-Communication Module 232, and a Pixel-Creation Module 234. Each of these modules may be code or routines for performing the necessary functionalities. In particular, the All-Bids-Analysis Module 231 determines all the bids in the all bid embodiment and the All-Bids-Analysis Module 231 performs the analysis relating to all the bids.

Figure 3A:
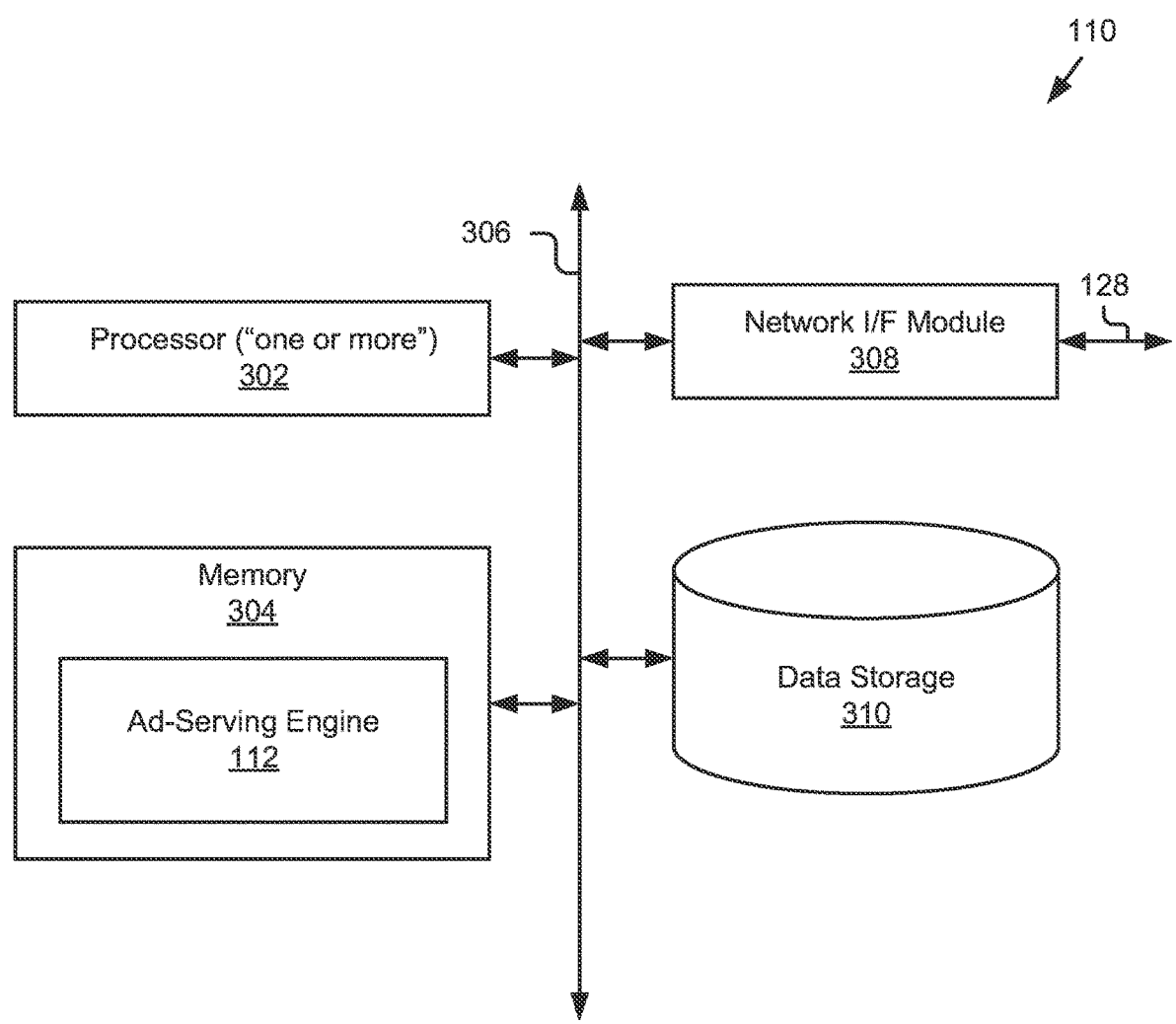
FIG. 3A illustrates a block diagram of an example advertisement serving system in accordance with some embodiments of the present invention.

Referring now to FIG. 3A, the Ad Serving System 110 is described. In some implementations, the Advertisement Server 110 may include one or more processors 302, a memory 304 with an Ad Serving Engine 112, a network I/F module 308, and storage 310. The processor 302 processes data signals and program instruction received from the memory 304. The processor 302 may comprise various computing architectures including a complex instruction set computer (CISC) architecture, a reduced instruction set computer (RISC) architecture, or an architecture implementing a combination of instruction sets.

The memory 304 is non-transitory storage medium. The memory 304 stores the instructions and/or data which may be executed by the processor 302. In some embodiments, the instructions and/or data stored on the memory 304 comprises code for performing any and/or all of the techniques described herein. The memory 304 may be a dynamic random access memory (DRAM) device, a static random access memory (SRAM) device, flash memory or some other memory device known in the art. The memory 304 includes the Ad Serving Engine 312 for implementing the enhanced features. The network I/F module 308 facilitates the communications between all the components over the bus 206.

The data storage 310 stores the data and program instructions that may be executed by the processor 302. In some embodiments, the data storage 310 includes a variety of non-volatile memory permanent storage device and media such as a hard disk drive, a floppy disk drive, a CD-ROM device, a DVD-ROM device, a DVD-RAM device, a DVD-RW device, a flash memory device, or some other non-volatile storage device known in the art.

Figure 3B:
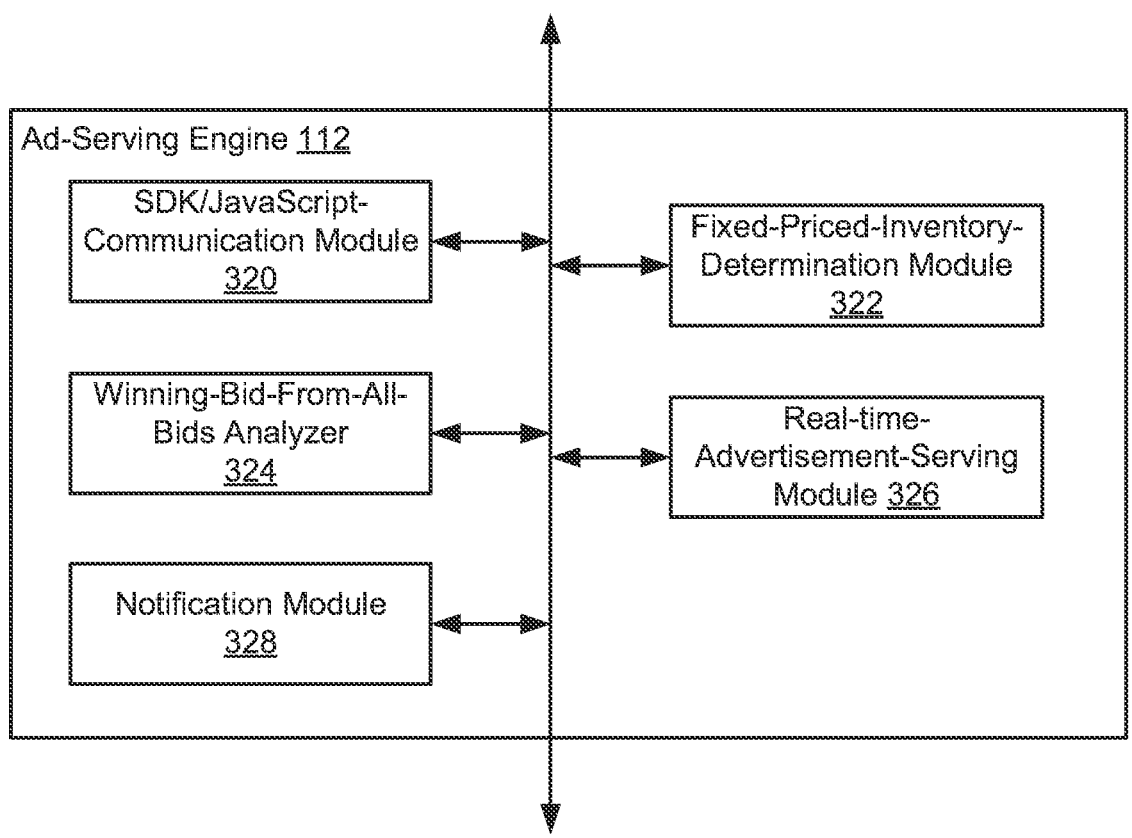
FIG. 3B illustrates an example Advertisement ("Ad") Serving Engine in accordance with some embodiments of the present invention, involving client-side bidding and determination of a winning bid.

Referring now to FIG. 3B, the Ad Serving Engine 112 is illustrated and described. The Ad Serving Engine 112 includes a JavaScript Communication module 320, a Fixed Price Inventory Determination Module 322, a Winning Bid Analyzer 324, a Real-time Advertisement Serving Module 326, and a Notification Module 328. In some implementations, the JavaScript communication module 220 may be software including routines for facilitating communications. In some implementations, the JavaScript communication module 320 may be a set of instructions executable by the processor 302 to provide the functionality for generating and managing communications. In other implementations, the JavaScript communication module 320 may be stored in the memory 304 (FIG. 3A) and may be accessible and executable by the processor 302 (FIG. 3A). In either implementation, JavaScript communication module 320 may be adapted for cooperation and communication with the processor 302, data storage 310 and other components via the bus 306 (3A).

The Fixed Priced Inventory Determination Module 322 determines a fixed price. In some implementations, the Fixed Priced Inventory Determination Module 322 may be software including routines for determining fixed pricing. In some implementations, the Fixed Priced Inventory Determination Module 322 may be a set of instructions executable by the processor 302 (FIG. 3A) to provide the functionality for determining fixed pricing. In other implementations, the Fixed Priced Inventory Determination Module 322 may be stored in the memory 304 (FIG. 3A) and may be accessible and executable by the processor 302 (FIG. 3A). In either implementation, Fixed Priced Inventory Determination Module 322 may be adapted for cooperation and communication with the processor 302, data storage 310 and other components via the bus 306 (FIG. 3A).

The Winning Bid Analyzer 324 analyzes the winning bid. In some implementations, the Winning Bid Analyzer 324 may be software including routines for analyzing the winning bid. In some implementations, the Winning Bid Analyzer 324 may be a set of instructions executable by the processor 302 (FIG. 3A) to provide the functionality for analyzing the winning bid. In other implementations, the Winning Bid Analyzer 324 may be stored in the memory 304 (FIG. 3A) and may be accessible and executable by the processor 302 (FIG. 3A). In either implementation, the Winning Bid Analyzer 324 may be adapted for cooperation and communication with the processor 302, data storage 310 and other components via the bus 306 (FIG. 3A).

The Real-time Advertisement Serving Module 326 serves the winning advertisement in real time. In some implementations, the Real-time Advertisement Serving Module 326 may be software including routines for serving the advertisement in real time. In some implementations, the Real-time Advertisement Serving Module 326 may be a set of instructions executable by the processor 302 (FIG. 3A) to provide the functionality for serving the advertisement in real time. In other implementations, the Real-time Advertisement Serving Module 326 may be stored in the memory 304 (FIG. 3A) and may be accessible and executable by the processor 302 (FIG. 3A). In either implementation, Real-time Advertisement Serving Module 326 may be adapted for cooperation and communication with the processor 302, data storage 310 and other components via the bus 306 (FIG. 3A).

The Notification Module 328 provides notifications. In some implementations, the Notification Module 328 may be software including routines handling ad requests. In some implementations, the Notification Module 328 may be a set of instructions executable by the processor 302 (FIG. 3A) to provide the functionality for providing notifications. In other implementations, the Notification Module 328 may be stored in the memory 304 (FIG. 3A) and may be accessible and executable by the processor 302 (FIG. 3A). In either implementation, the Notification Module 328 may be adapted for cooperation and communication with the processor 302, data storage 310 and other components via the bus 306 (FIG. 3A).

According to an embodiment of the present invention and referring to FIGS. 2 and 3, an end-user (e.g., via User Device 115a) visits a web page. The web page requests that JavaScript be loaded from the Content Delivery Server 126 (FIG. 1). The JavaScript creates multiple workers (FIG. 2A) or iframes or script tags that make simultaneous parallel requests to real-time bidders for each ad slot. The bidders respond with a JSON object that contains information about their winning bid and advertisement for each slot. The system then updates information about the winning bids in the browser cookie along with segmentation data using a pixel (FIG. 1). In some instances, the system sends all the prices on the Ad Server 102. In some implementations, the system may check winning bids against segment data (e.g., User Segmentation Information 124) for the user to determine if the bid meets a pre-determined pricing threshold for the user segment. If the winning bid is acceptable, the bid is passed to the Ad Server 102 using a key/value pair. The Ad Server 102 compares the winning bid against inventory present in the Ad Server 102 and the winning advertisement may be selected. If the real-time bidder wins, a JavaScript code is passed back from the Ad Server 102 to the web page to render the advertisement stored within the page. Also, the user cookie is updated with information about the winning bidder.

According to an embodiment of the present invention, for each user request the system checks the cookie to determine if current segmentation data provided by data providers is available. In the event no current segmentation data is available, the system can request this data from the applicable data vendors by rendering a JavaScript tag in the web page. The winning bid is retrieved from the parallel client-side auction. The system writes a pixel to the page that describes information about the winning bid and segmentation data provided by the data vendors. The data is aggregated and pricing thresholds are determined for each segment for future real-time bidder requests. The pricing thresholds are updated in a JavaScript file for each site and are downloaded by the client before requests are made.

In operation, this system architecture facilitates multiple requests to multiple bidders. In order to make multiple requests to multiple bidders, embodiments of the present invention utilize web workers 214 (FIG. 2A), if available from within the client browser (e.g., 120a). If web workers 214 are not available, embodiments of the present invention can use hidden iframes to make multiple requests and return values by calling a function in the parent browser window. First, the website publisher sets the site and ad unit name from within the header of the web page. Such page headers are used to lookup the identifications ("ids") & sizes of the various ad units within the web page. Using these parameters, the system downloads a JSON specific for the site that contains mappings between each ad unit and their associated ids for each real-time bidder. This object also contains information regarding size of the ad unit and callback functions. Second, each URL necessary to make a call to the associated real-time bidding platform is assembled using the lookup:
Example URLs:
http://www.rtb1.com/rtb?id=12345&size=300×250&flash=1&cookies=1&callback=300×250_1&referrer=refferrer
http://www.rtb2.com/rtb?id=23456&size=300×250&flash=1&cookies=1&callback=300×250_1&referrer=refferrer In some implementations, a new web worker or iframe may be created for each RTB URL. The web worker 214 asynchronously retrieves the bid and advertisement from the bidder and returns it to the main thread. In the event the browser does not support the web workers 214, the system is configured to use iframes to make each individual call. This is accomplished by programmatically creating an iframe for each RTB call and writing a script tag to the iframe. The information is retrieved by calling a JavaScript function in the main page from the iframe.

In some implementations during the period in which bid requests are being made to bidders, the system makes requests to data providers (e.g., Data Vendor(s) 121) to return detailed segmentation data on the user (e.g. User Segmentation Information 124). This information is stored in a cookie so that in future requests for this user there is no need to make an additional call to the data provider.

In some implementations, the main thread waits until it has received a response from each worker or iframe. After the main thread has either received a response or reached the max time, it determines the maximum bid response received. The maximum bid response value is measured against the value for the data segment and a decision is made whether to pass the bid to the Ad Server or not. The data segmentation information is retrieved and updated in JSON format. The system determines segment pricing using an algorithm that looks at mean prices by user segment. If the bid received is a set percentage below the average bids received for the user's segmentation than the bid is rejected. The data is gathered by writing a pixel along with the winning ad with bid & segment information.

In some implementations, a set of campaigns are created in the Ad Server(s) 102 for each bidder associated to the key/value pairs. The system creates one or more keys for the maximum number of advertisements of a specific size for placement on a single page of the web site. By way of example, if a site has a maximum of five ads on one page then the system generates five unique keys. In some instances, only one key may be required. The system then traffics/creates campaigns in the Ad Server(s) 102 for each bidder and assigns them to each key. In the above example, the Ad Server(s) 102 key would be KEY1 and the value would be rtb1_size_order_bid where rtb1 is the name of the real-time bidder, size is the size of the ad slot, and order is the numerical position of the ad on the page and bid represents the nominal value of the rtb1's returned bid. The numerical position is necessary because a page might contain more than one ad of the same size.

In some implementations, for each campaign set-up in the system, the system traffics a "creative" (or a group of "creatives") that calls the associated URL stored in the web page. In the above example, the system sets the returned URL from the bid request in the web page as ad[rtb1_size_order]. In the associated "creative" (or group of "creatives") the system renders this to the page using JavaScript that renders the stored variable in the page.

The system also appends another script to the "creative" (or a group of "creatives") that renders a pixel in the browser and makes a request to the system's servers. The winning bid and any information from data providers are sent as a pixel request to the system's server. The system utilizes this information to make intelligent decisions regarding the value of different user segments and for reporting purposes. The value of each user segment is the calculated mean of all the requests made to the server. The system then calculates a standard deviation of the requests and this value is used to determine the threshold minimum value for specific user requests.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

Methods and Algorithms for Conducting Client-Side Bidding

Figure 4:
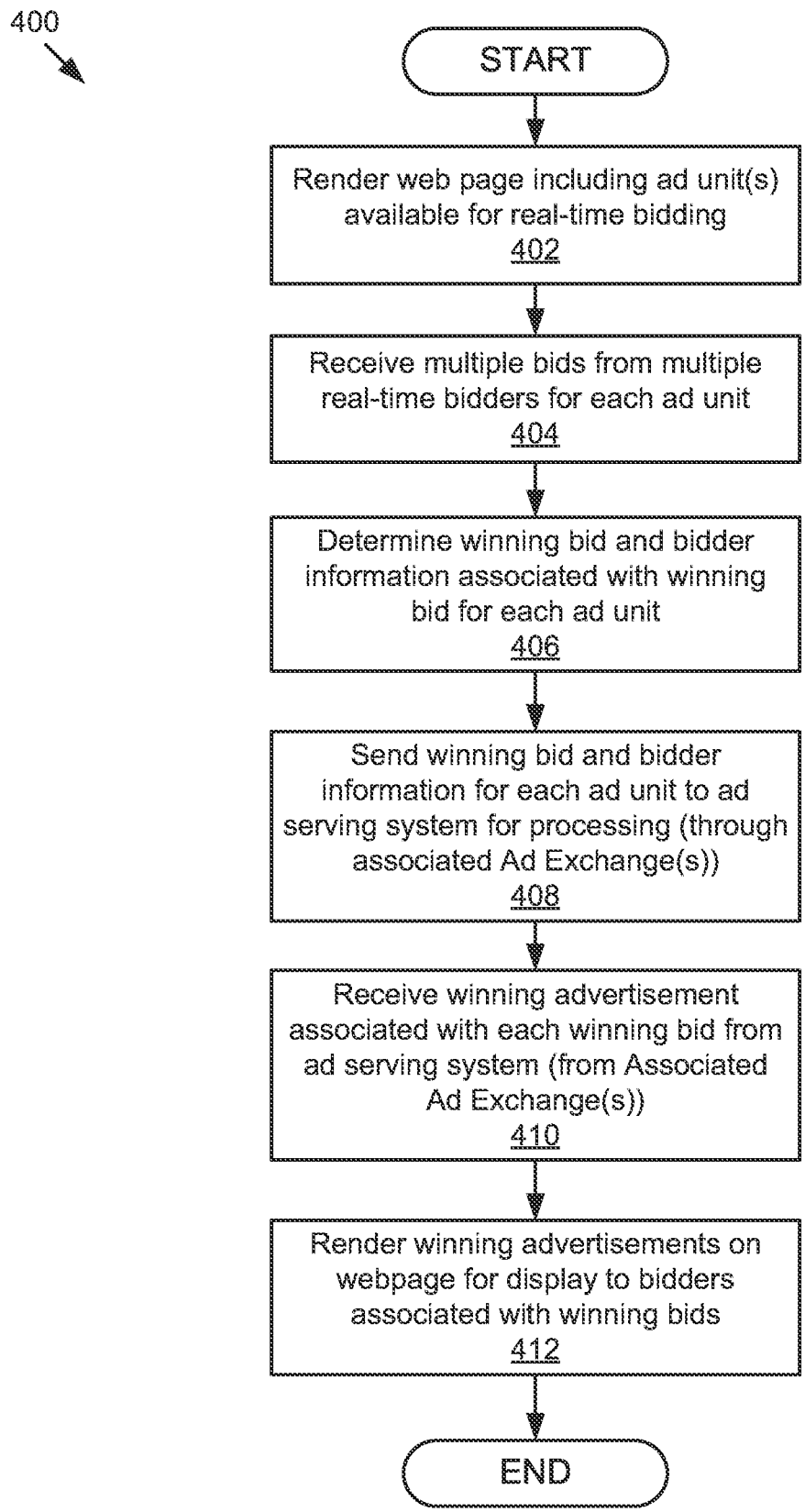
FIG. 4 illustrates a flow chart of an example process in accordance with one embodiment, for conducting a client-side real-time auction, with a winning bid, in accordance with some embodiments of the present invention.

Referring now to FIG. 4, the process for conducting client-side real-time auctions are described, as indicated by reference numeral 400. The process 400 may begin and proceed to block 402, including one or more operations for rendering a web page including advertisement units that are available for real-time bidding. The process 400 proceeds to the next block 404, including one or more operations for receiving multiple bids from multiple real-time bidders or each advertisement unit. The process 400 proceeds to the next block 406 including one or more operations for determining winning bids and bidder information associated with winning bids for each advertisement unit. The process 400 proceeds to the next block 408 including one or more operations for sending the winning bid and bidder information for each advertisement unit to the Advertising Serving System 110 for processing (through the associated one or more Ad Exchanges 138). The process 400 proceeds to the next block 410 including one or more operations for receiving winning advertisements associated with each winning bid from the Advertisement Serving System 110 (through the associated one or more Ad Exchanges). The process 400 proceeds to the next block 412, including one or more operations for rendering the winning advertisements on the web page for display to the bidders associated with the winning bids.

FIGS. 5A through 5D represent a continuous flowchart of a specific method 500 for conducting client-side real-time auctions. The method 500 begins and proceeds to block 502, including one or more operations for rendering a web page including advertisement unit(s) available for real-time bidding. The method 500 proceeds to block 504 including one or more operations for requesting JavaScript for initiating real-time bidding. The method 500 proceeds to the next block 506, including one or more operations for loading the JavaScript for the real-time bidding. The method 500 proceeds to the next block 508 including one or more operations for sending or receiving multiple parallel requests to multiple real-time bidders (including associated one or more ad exchanges 138) for advertisement unit, by using appropriate technologies. In some instances a request may be sent by web workers (e.g. web workers 214 in FIG. 2A). In some instances, a request may be sent or received by JSONP (JavaScript Object Notation with Padding), a technique used by web developers to overcome cross-domain restrictions imposed by browsers. In some instances, a request may be sent or received by using AJAX (Asynchronous JavaScript and XML), a group of interrelated web development techniques used on the client-side to create interactive web applications or rich internet applications. These create better, faster, and more, interactive web applications with XML, HTML, CSS, and Java Script. From there, the method 500 proceeds to the next block 510 including one or more operations for receiving bids and desired advertisements for each advertisement unit from multiple real-time bidders. The method 500 proceeds to the next block 512 including one or more operations for waiting for a pre-determined time or until all the bidders' responses are received. The method 500 proceeds to the next decision block 514 including one or more operations for determining if the pre-determined time has passed, lapsed or completed and if all the responses are received. If the answer is negative, the method 500 returns to block 512 for waiting until the time period has lapsed. If the answer is affirmative, the method 500 continues via connector "A" to the next block 516 in FIG. 5B including one or more operations for determining a winning bid for each advertisement unit. The method 500 proceeds to the next block 518 including one or more operations for requesting historical pricing information by a number of requests for an advertisement unit and user segmentation information from data vendors (e.g., at Data Vendor(s) sites 121). The method 500 proceeds to the next block 520 including one or more operations for receiving historical pricing information for each advertisement unit and user segmentation information for the bidder associated with the winning bid from the data vendors. The method 500 proceeds to the next block 522 including one or more operations for determining for the winning bid whether the bid satisfies the minimum pricing threshold based on the historical pricing information and user segmentation information. The method 500 proceeds to the next decision block 524 including one or more operations for making a determination if the bid satisfies a minimum pricing threshold. If the answer is negative, the process 500 continues to a next block 526 including one or more operations for determining the next winning bid for each advertisement unit and then returns to block 522 to continue the loop. If the answer is affirmative, the process 500 proceeds to the next block 528 including one or more operations for generating and setting key/value pairs for the winning bids, wherein the key/value pair describes the bidder's and bidding information associated with the winning bid. The method 500 proceeds via connection "B" to the next 5C.

Figure 5A:
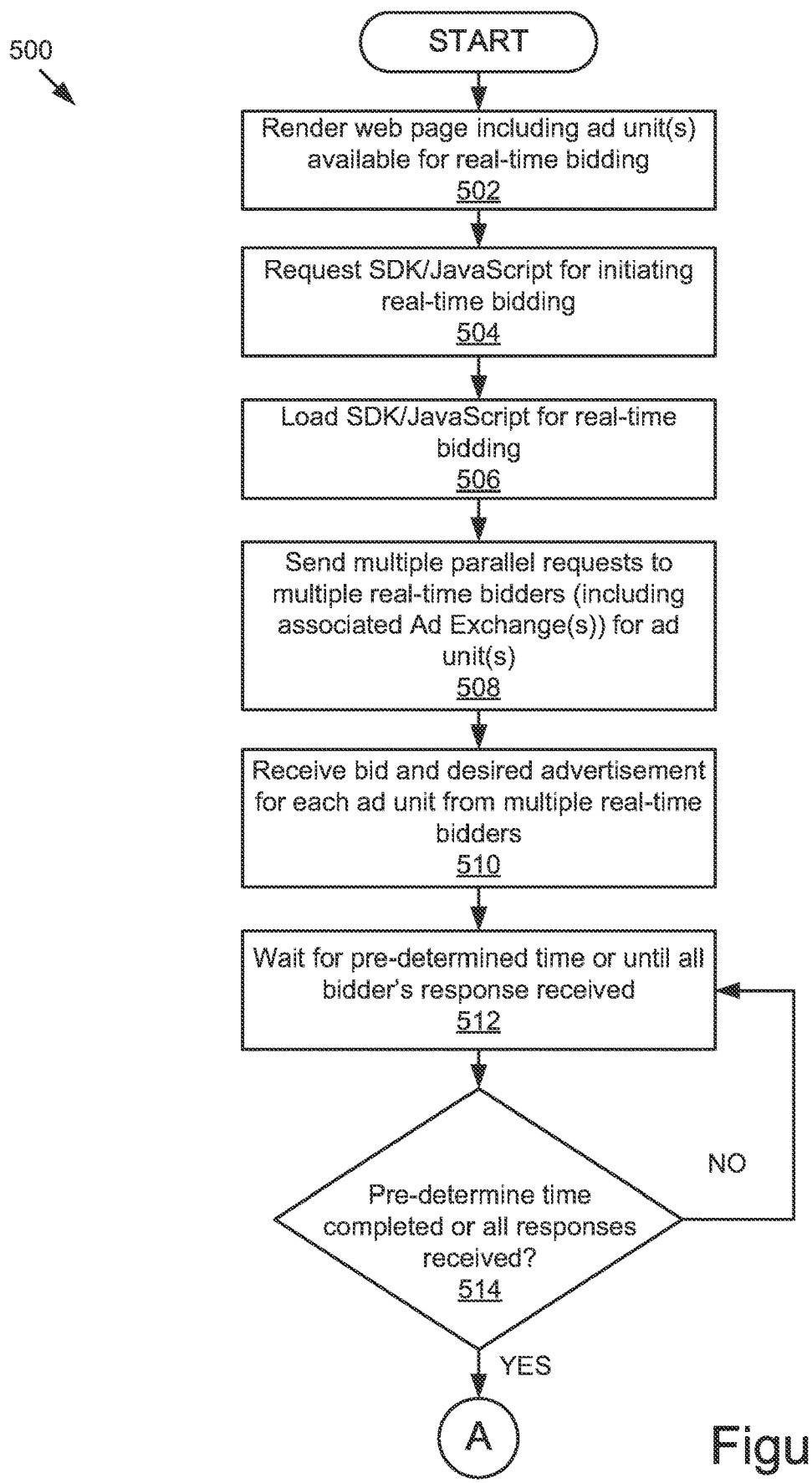
FIGS. 5A-5D together illustrates a flowchart of a specific method in accordance with one embodiment for real-time bidding to determine a winning bid for one or more advertisement units by multiple real-time bidders.
Figure 5B:
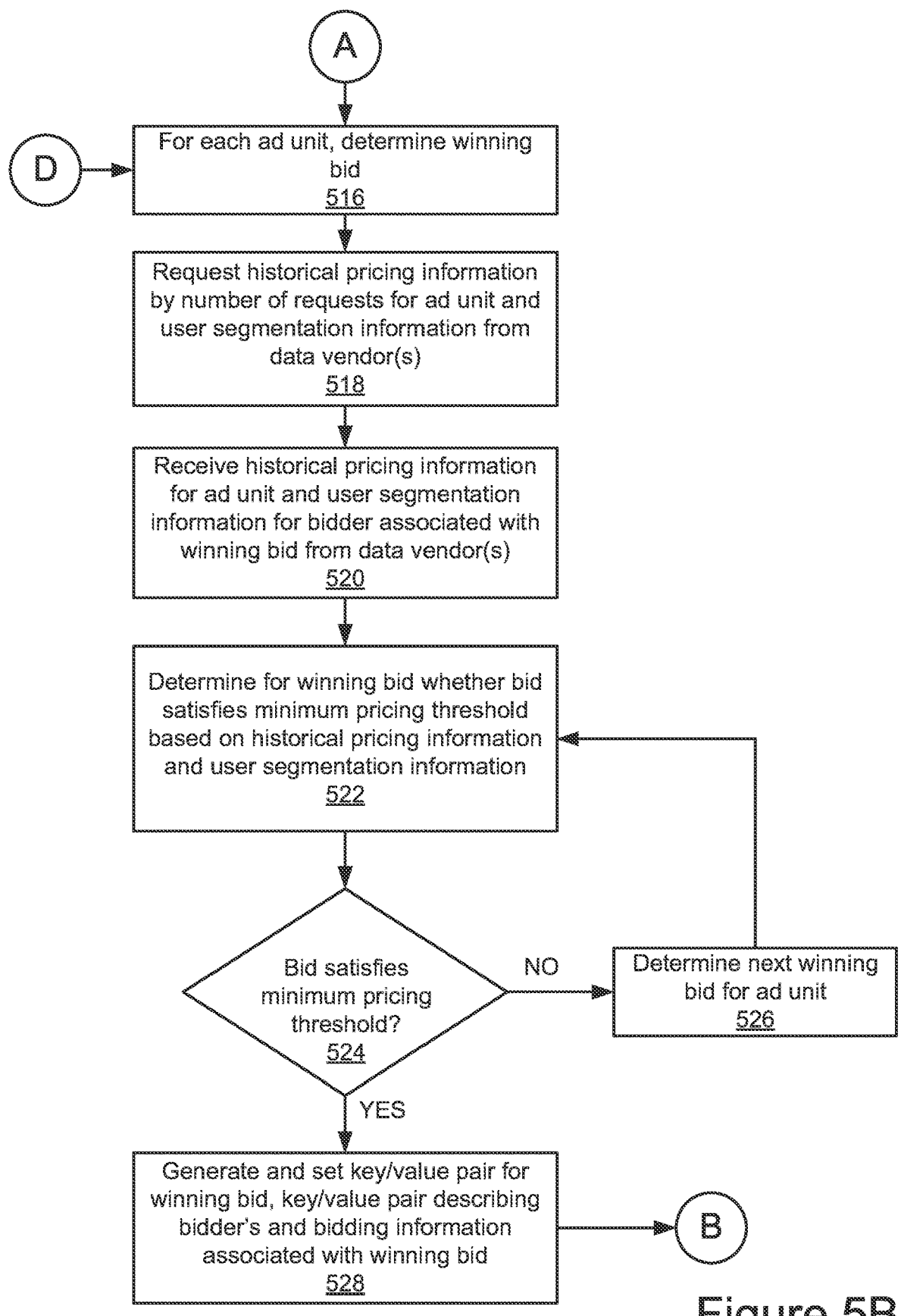
Figure 5C:
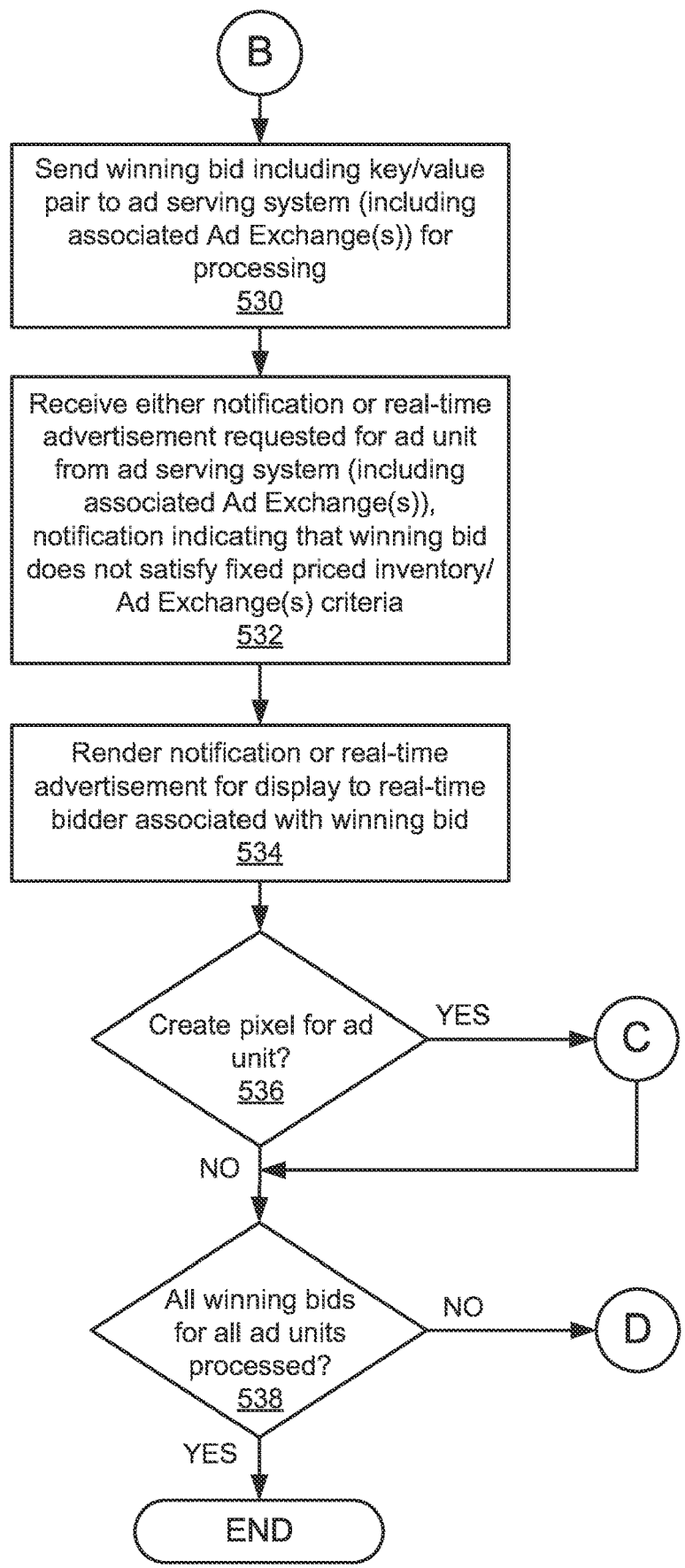

Referring now to FIG. 5C, the method 500 proceeds to block 530 including one or more operations for sending winning bids including key/value pairs to the Ad Serving System 110 for processing (through associated one or more Ad Exchanges 138). In some instances, the one or more Ad Exchanges 138 may be configured as part of the Ad Serving System in a distributed or other architecture. The method 500 proceeds to the next block 532 including one or more operations for receiving either a notification or real-time advertisements from the Ad Serving System 110 (including associated one or more ad exchanges) requested for each advertisement unit, wherein the notification indicates that the winning bid does not satisfy fixed price inventory or one or more ad exchange criteria. The method 500 proceeds to the next block 534 including one or more operations for rendering notification or real-time advertisements for display to real-time bidders associated with the winning bid. From there, the method 500 proceeds to the next decision block 536 including one or more operations for determining if a pixel for the advertisement unit should be created. If the answer is affirmative, the method 500 proceeds to a connector "C," which presents an option of either continuing at block 540 in FIG. 5D or continues to another decision block 538 (FIG. 5C). If the answer at decision block 536 is negative, the method 500 continues to the decision block 538, where a determination is made to decide if all the winning bids for all the advertisement units have been processed. If the answer is negative, the process 500 continues to connector "D" and through it returns to block 516 (in FIG. 5B), where the process 500 determines the winning bid for each advertisement unit. If the answer at decision block 538 is affirmative, the process 500 continues to an end.

Figure 5D:
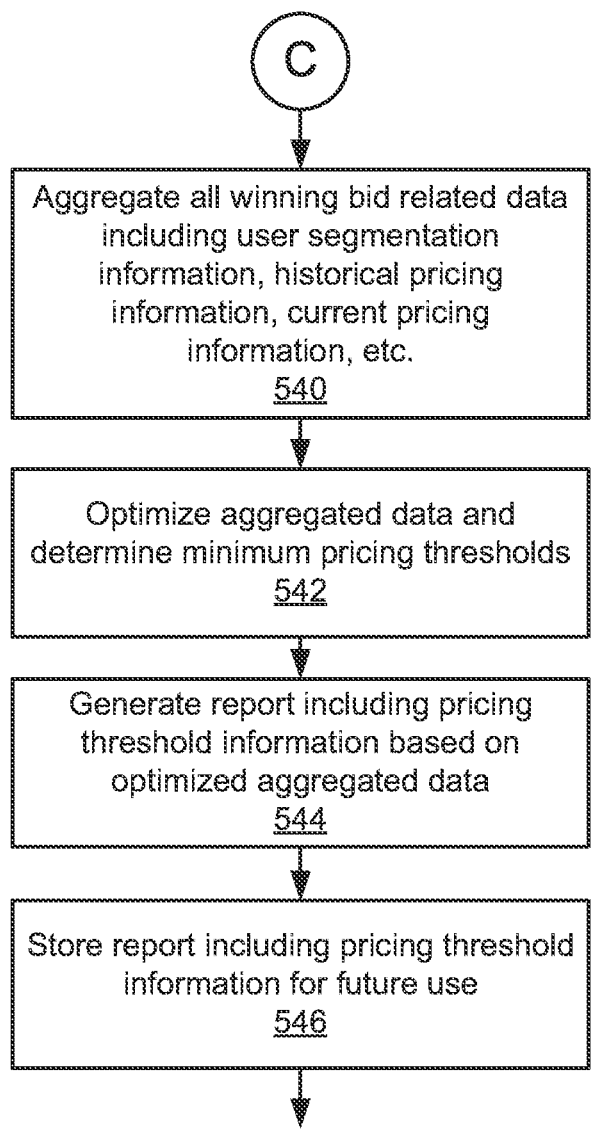

Referring now to FIG. 5D, via connector "C," the method 500 proceeds to the next block 540 including one or more operations for aggregating all winning bids related data including user segmentation information, historical pricing information, and current pricing information, etc. The method 500 proceeds to the next block 542 including one or more operations for optimizing aggregated data and determining minimum pricing thresholds. The method 500 proceeds to the next block 544 including one or more operations for generating a report including pricing threshold information based on the optimized aggregated data. The method 500 proceeds to the next block 546 for storing the report including pricing threshold information for future use.

Figure 6A:
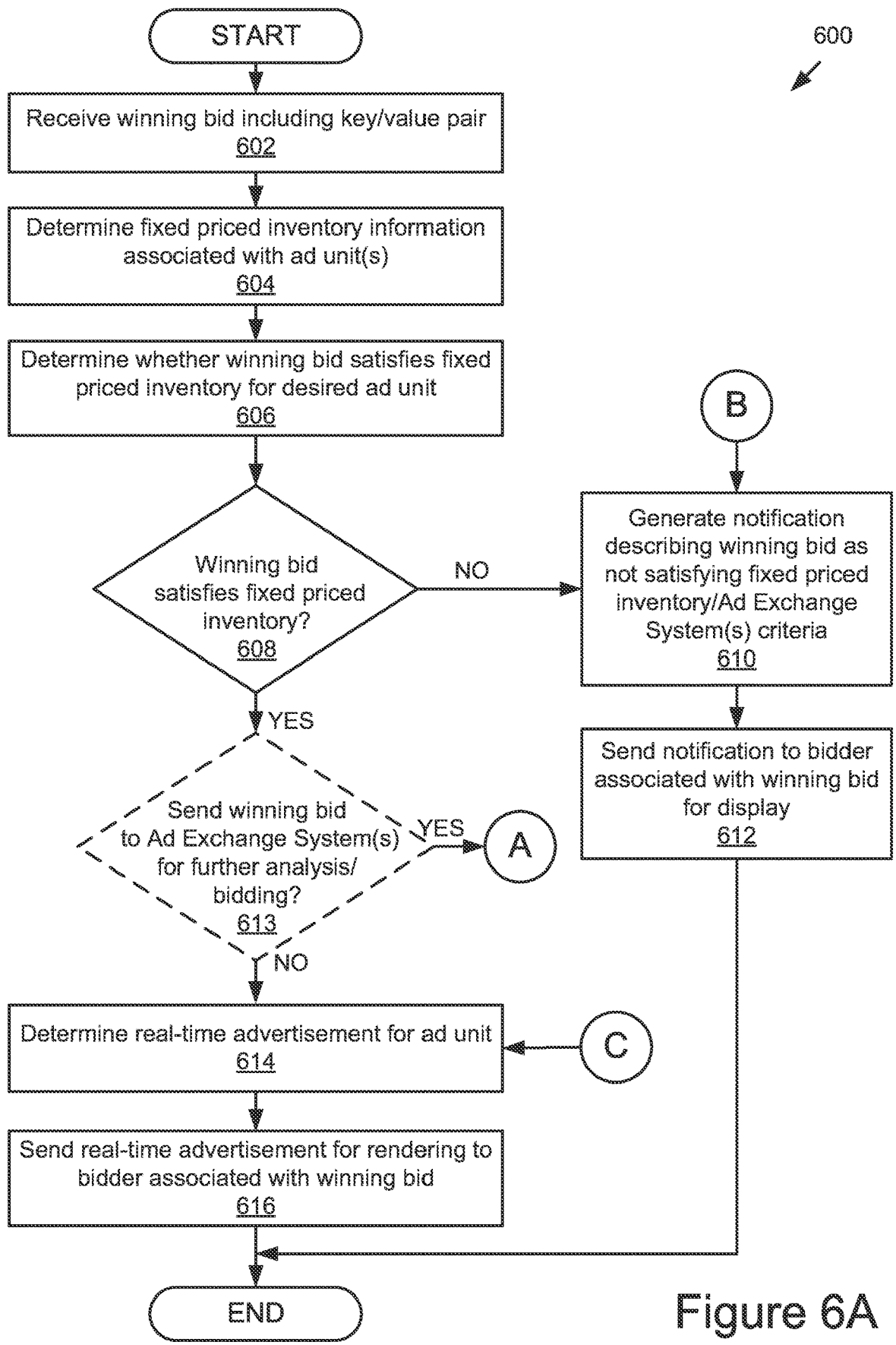
FIGS. 6A-6B is a flowchart of an example method in accordance with one embodiment illustrating the processing operations at the advertisement serving system, when the bidding is client side for determination of a winning bid.
Figure 6B:
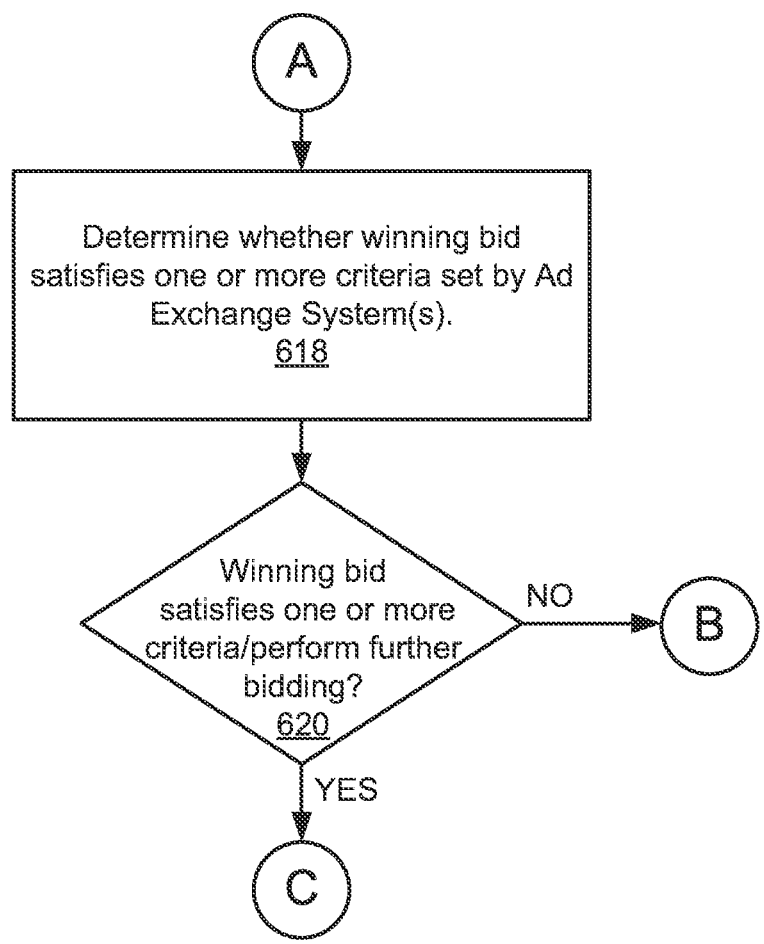

Referring now to FIGS. 6A-6B, the processing operations at the Advertisement Serving System 110 are described. The process 600 begins (in FIG. 6A) and proceeds to block 602 for receiving winning bids including a key/value pair. The process 600 proceeds to the next block 604 including one or more operations for determining the fixed price inventory information associated with each advertisement unit. The process 600 proceeds to the next block 606 including one or more operations for determining whether the winning bid satisfies fixed priced inventory for desired advertisement units. From there, the process 600 proceeds to the next decision block 608 including one or more operations for determining if a winning bid satisfies the fixed priced inventory. If the answer is negative, the process proceeds to the next block 610 including one or more operations for generating notifications describing winning bids as not satisfying fixed prices inventory. From there, the process 600 proceeds to the next block 612 including one or more operations for sending a notification to a bidder associated with the winning bid for display and then continues to an end. If the answer at the decision block 608 is affirmative, the process 600 proceeds to the next decision block 613 (shown in broken lines, as in some implementations, this process may be omitted) including one or more operations for sending the winning bid to the one or more Ad Exchanges 138 for further analysis or for further bidding. If the answer is affirmative, the process 600 proceeds via connector "A" to the next block 618 (in FIG. 6B) including one or more operations for determining whether the winning bid satisfies one or more criteria set by the one or more Ad Exchange Systems 138. From there, the process proceeds to the next decision block 620 (in FIG. 6B) to determine whether the winning bid satisfies one or more criteria or to perform further bidding. If the answer is negative, the process 600 proceeds via connector "B" to block 610 (in FIG. 6A). If the answer is affirmative, the process 600 proceeds via connector "C" to the next block 614.

If the answer at block 613 is negative, the process 600 proceeds to the next block 614 including one or more operations for determining real-time advertisements for advertisement units. The process 600 continues to the next block 616 including one or more operations for sending real-time advertisements for rendering to bidders associated with the winning bid. From there, the process proceeds to the end.

Figure 7:
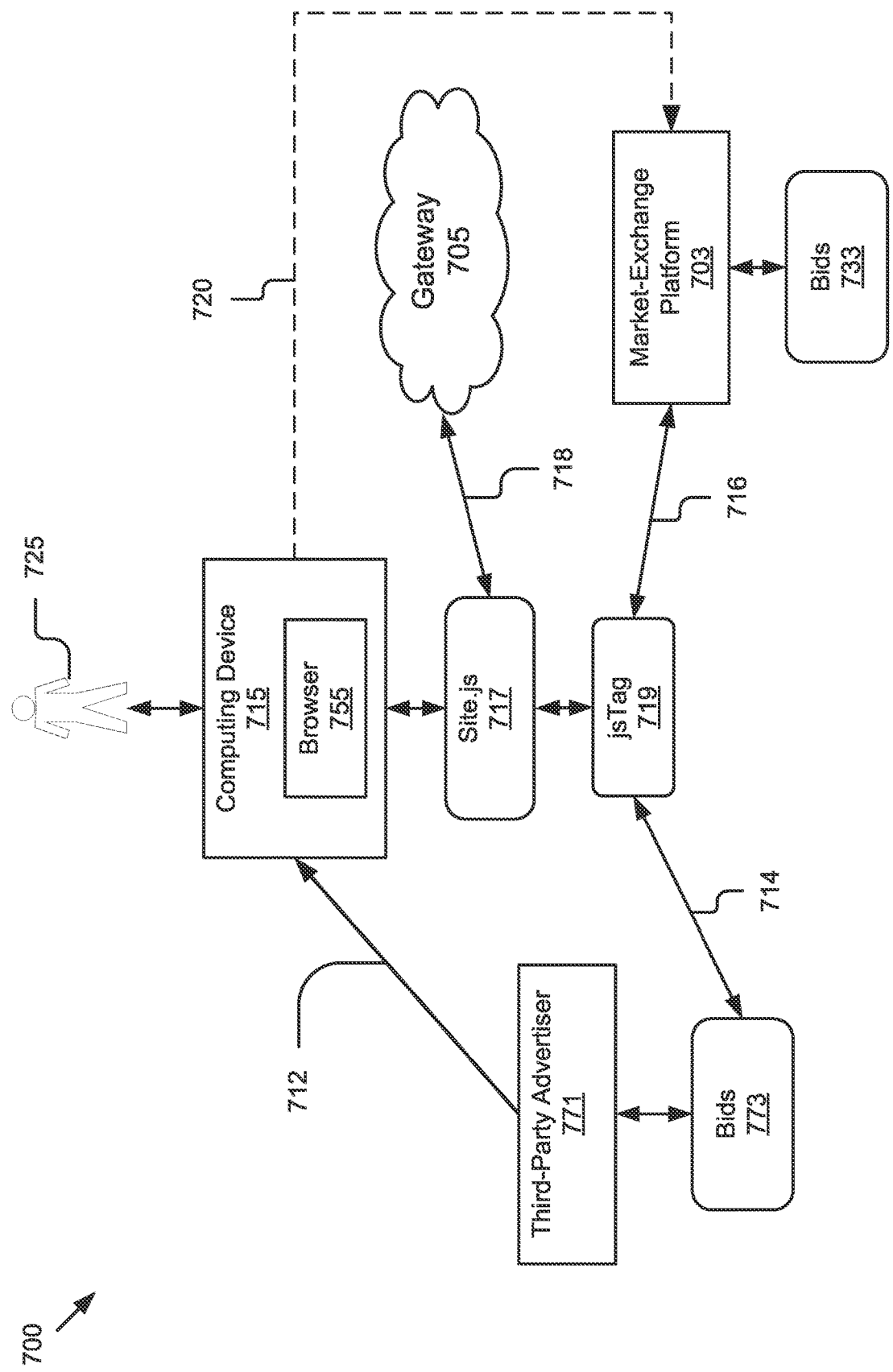
FIG. 7 is a block diagram of an exemplary client-side real-time auction environment with an illustration of operations to insert a code.

Referring now to FIG. 7, in operation, this integrated architecture for client-side real-time auctions is configured for use by those publishers who use third-party ad serving platforms designed for both small and large publishers. The system illustrated may use a computing device 715, with browser 755 in communication with a Site.js 717, which is coupled to a Gateway 705 by signal line 718. The computing device 715 is illustrated in communication (with broken lines 720) with a market exchange platform 703 for considering bids 773. A third-party advertiser 771 considers bids indicated by reference numeral 773. The market exchange platform 703 is in communication with jsTag 719, via line 716, and the third-party advertiser is in communication with the computing device 715, via line 712.

In some implementations, these large platforms may be configured with all non-guaranteed campaigns set to compete based on a price threshold. Publishers may use page implementation operations that include replacing tags or code placed by conventional third-party ad serving platforms on their webpages (on Site.js 717), with new tags or code 719, for example, referred to as a "LiftTag." This permits any particul are third-party platform utilizing the present technology to interrupt the ad request before sending it to other third-party ad serving platforms.

For page implementation, publishers may replace their conventional page tags with a "LiftTag." This is to divert a particular "ad request" before sending it to a conventional platform. The present technology uses key value targeting to pass the "Market bid" price from a particular third-party platform into another third-party platform. An appropriate number of key values should be used to target to make sure that all the information is properly forwarded. In some implementations, eight out of twenty may be used. In some instances, in the event publishers are migrated from conventional platforms, they have customized multi-part zones that may require customization in order to work properly. In addition, multi-size ad requests require special assessment.

In operation, at the user interface, a user 725 may land on a particular web page, at which point an Ad request is sent to a particular first third-party platform (e.g., Third-Party Advertiser 771). A winning bid is sent back to user's browser 755. A winning bid price is triggered in another second third-party platform (another Third-Party Advertiser 771) by calling a campaign with a key value. The second third-party platform runs selection and its house auction. If the first third-party platform wins, it renders the advertisement and fires the impression beacon.

For system operation, the publisher may retag their page and include the JavaScript files in their page header. The publisher may provide this system architecture (e.g. the first platform) API access to another third-party platform. The first platform runs a setup script that mirrors their inventory setup in the each of the real-time bidders' platforms. The technology in the first platform runs another script that creates an order in the second platform with campaigns for each price bucket. The technology (first platform) creates a configuration file that is stored on an internet traffic reporting website with inventory mapping for that site.

When this technology serves an advertisement, it is difficult to measure when a particular third-party platform wins, and another one loses. The third-party platforms are not configured to send an impression beacon in such instances, and when a particular platform attempts to fire a late impression beacon on the client-side, some percentage is lost. In such instances, the lost-to-another platform rate is indicated as "unbillable."

Figure 8A:
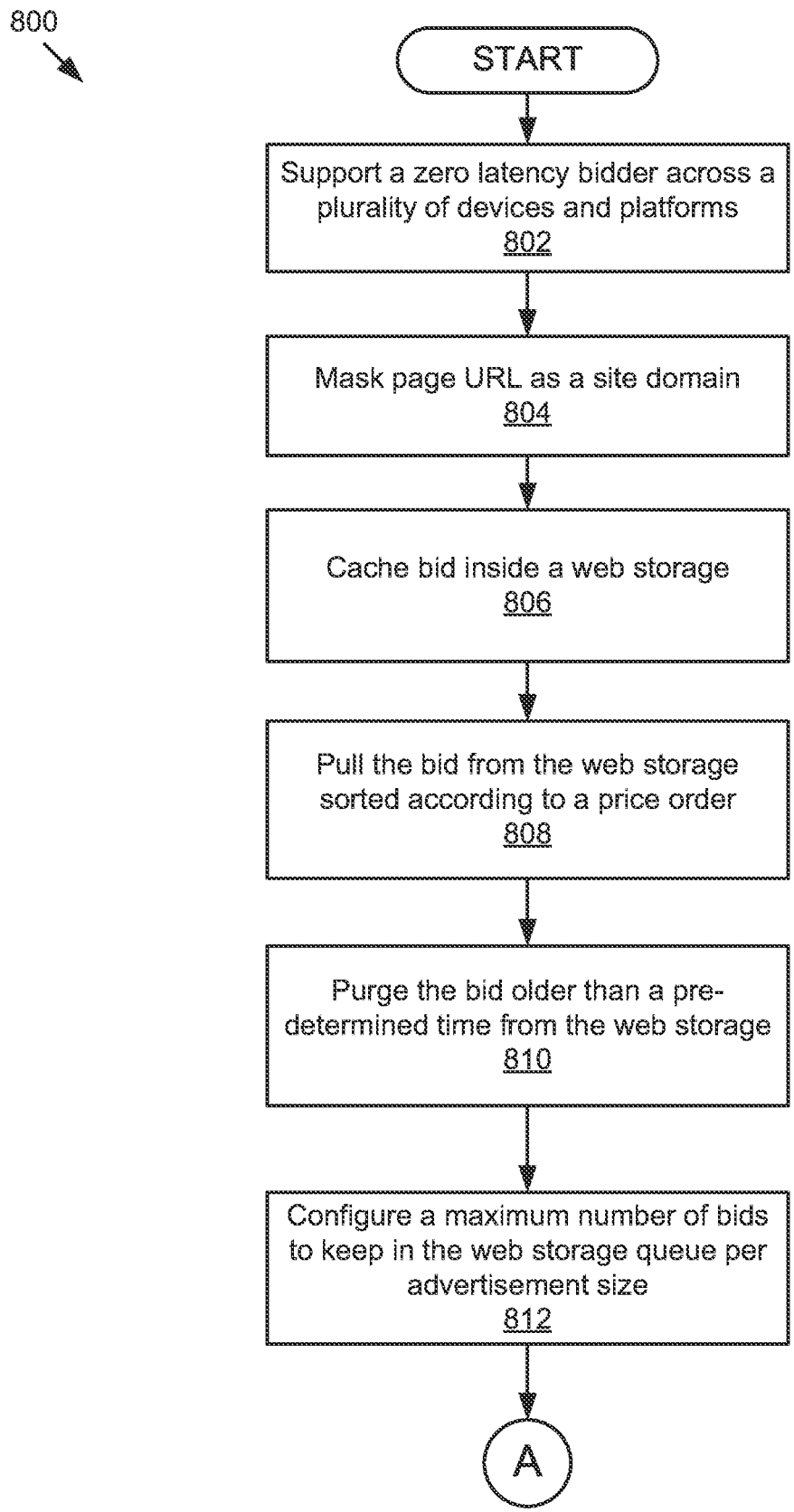
FIG. 8A is a flow chart of an example method in accordance with some embodiments that use a zero-latency bidder with algorithms for reducing latency.
Figure 8B:
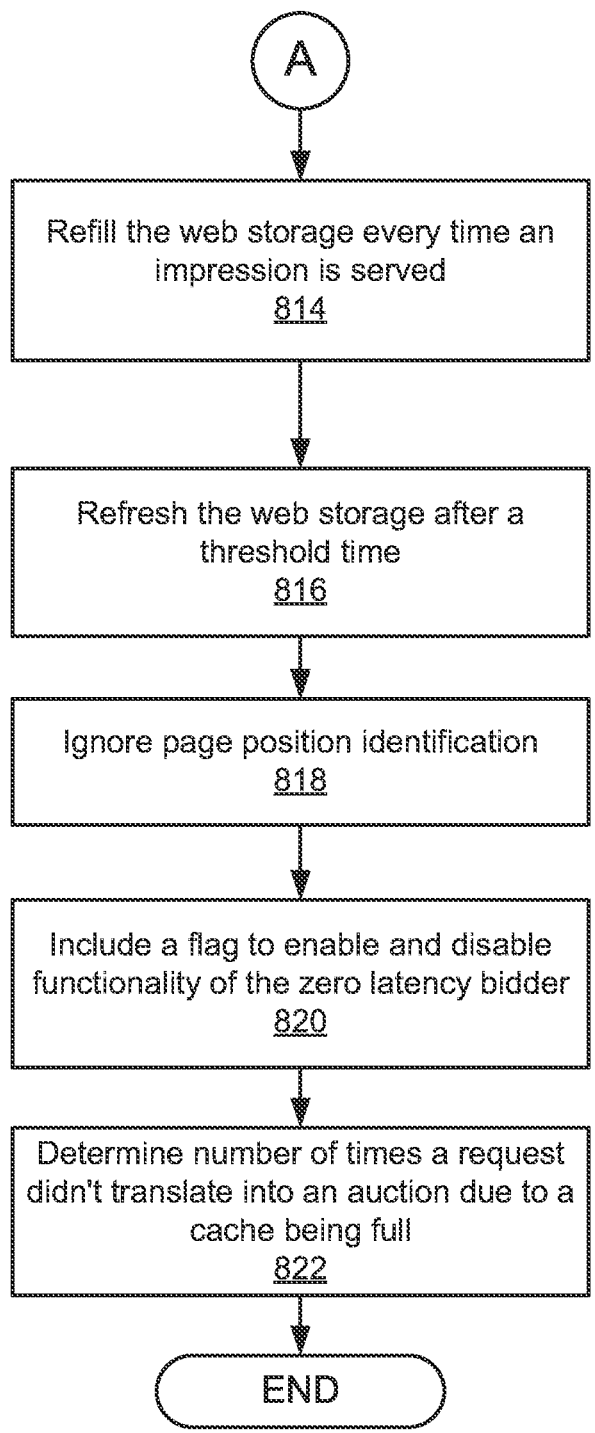
FIG. 8B is a continuation of the flow chart of FIG. 8A illustrating operations of the zero-latency bidder.

Referring now to FIG. 8A, the operations of the zero-latency bidder 135 are described in greater detail. It should be recognized that although the reference is to a zero-latency bidder, the zero latency also refers to low latency, and the intent here is simply to indicating quick page rendering. The general flow process indicated by reference numeral 800 proceeds to block 802 includes example operations, including but not limited to, supporting a zero latency bidder 135 across a plurality of devices and platforms. The process flow 800 proceeds to the next block 804, including but not limited to, example operations that mask the page URL as a site domain before soliciting bids. In some implementations, this operation may be performed by the masking engine 147 (in FIG. 1). The process flow 800 proceeds to the next block 806, including but not limited to, example operations that can cache a bid (auction result) inside a web storage. The masking operation ensures that the bids cached are for the domain level rather than the full page URL. The process flow 800 proceeds to the next block 808, including but not limited to, example operations that pull the bid from the web storage sorted according to a price order. The process flow 800 proceeds to the next block 812, including but not limited to, example operations that configure a maximum number of bids to keep in the web storage queue per advertisement size. The process flow 800 flows through a connector "A" to the next block 814 in FIG. 8B, including but not limited to, example operations that refill the web storage every time an impression is served. The process flow 800 flows to the next block 816, including but not limited to, example operations that refresh the web storage after a threshold time limit has passed. The process flow 800 flows to the next block 818, including but not limited to, example operations that can ignore page position identification. The process flow 800 flows to the next block 820, including but not limited to, a flag that is adapted to enable and disable functionality of the zero latency bidder 135. The process flow 800 flows to the next block 822, including but not limited to, determining the number of times a particular request did not translate into an auction because the cache memory is full.

Figure 9:
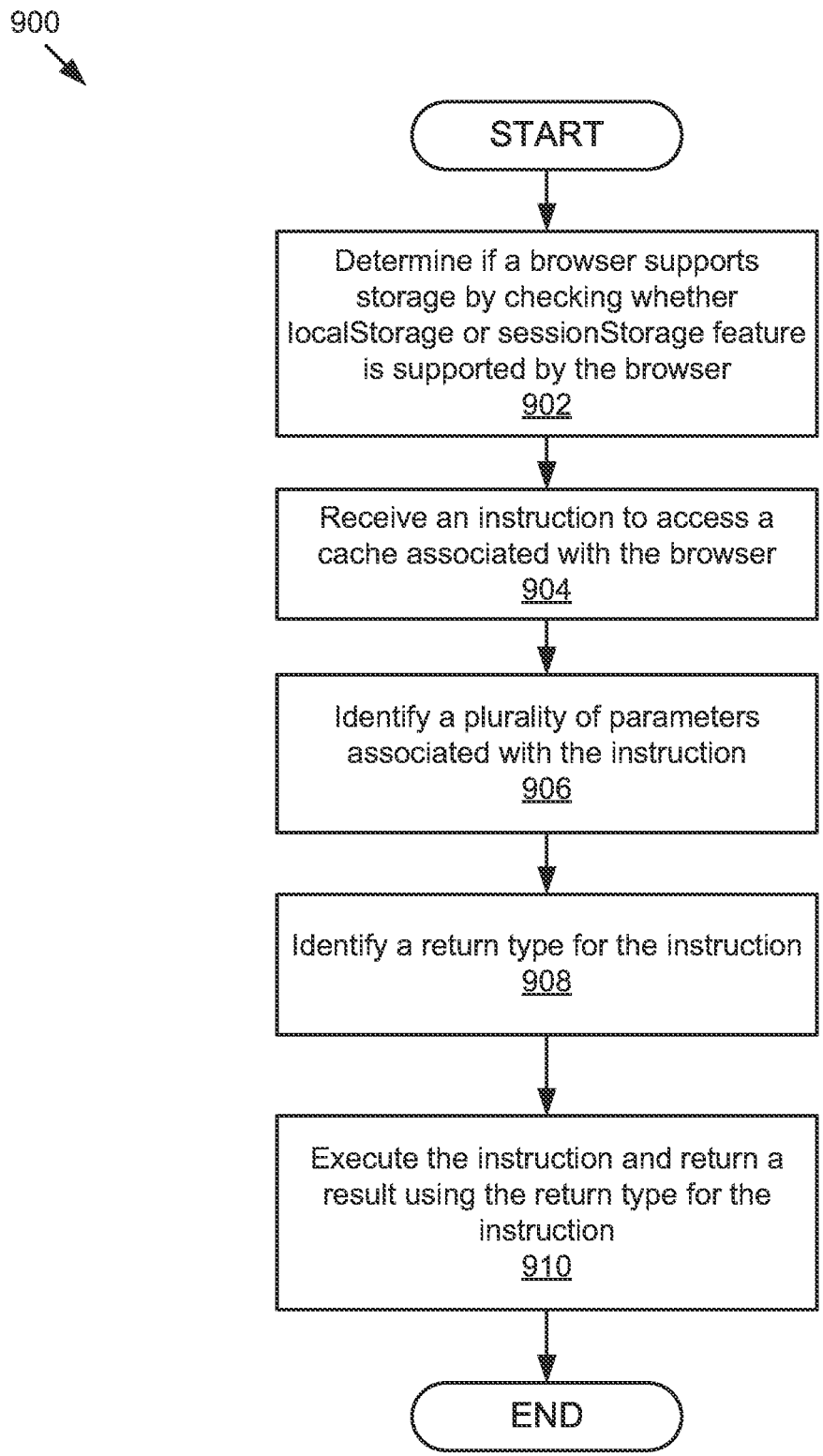
FIG. 9 is a flow chart of certain operations involving the zero-latency bidder.

Referring now to FIG. 9, the operations of the zero-latency bidder 135 are described in greater detail. The process flow designated generally by reference numeral 900 begin and proceed to block 902, including but not limited to, example operations to determine if a browser supports storage by checking whether localStorage or sessionStorage feature is supported by a browser (e.g., 120). The process flow 900 flows to the next block 904, including but not limited to, receiving an instruction to access a cache (e.g., 219 in FIG. 2) associated with a browser (e.g. 120). The process flow 900 flows to the next block 906, including but not limited to, example operations for identifying a plurality of parameters associated with the instruction. The process flow 900 proceeds to the next block 908, including but not limited to, example operations that can identify a return type for the instruction. The process flow proceeds to the next block 910, including but not limited to, example example operations that execute the instruction and return a result using the return type for the instruction.

Methods and Algorithms for Server-Side Technology

Figure 10A:
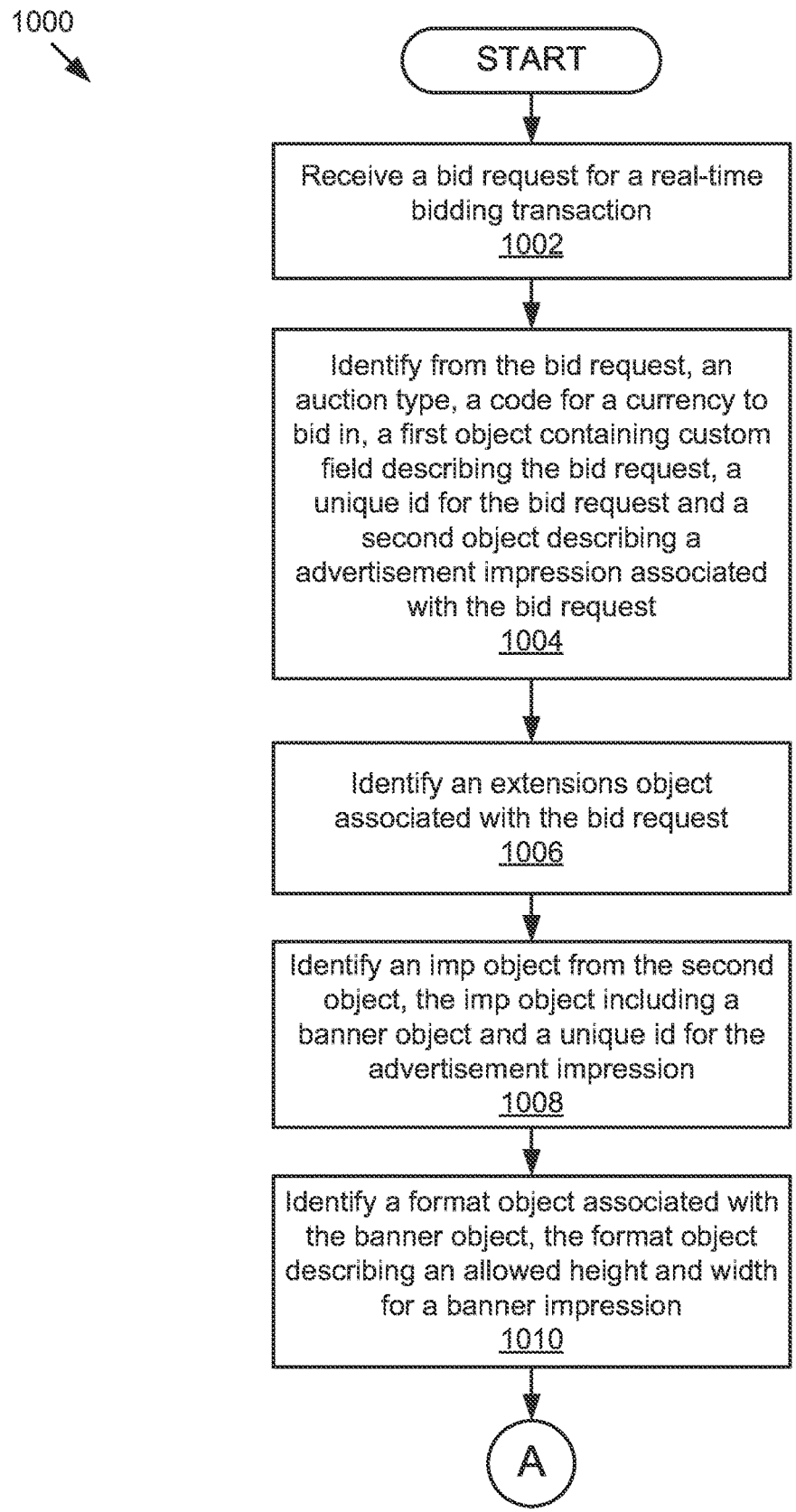
FIG. 10A is a flow chart of an example method in accordance with the all-bid embodiment, illustrating the bid request procedure.

Referring now to FIG. 10A, the operations of the bid request process in the all-bids embodiment is described. The process flow designated generally by reference numeral 1000 begins with receiving a bid request for a real-time bidding transaction, as designated by block 1002. In some instances, a server may initiate a real-time bidding transaction with demand partners by sending them a bid request. The bid request comprises a top-level bid request object, at least one impression object, and may include additional objects that provide impression context. In some instances, a bid request may be configured to specify a field name, data type, and description for each task. An example bid request may specify that it relates to an App and that it is an App object, which contains properties that describe the App, for example, where the ad will display if the bid request is for an impression within an "App." It should be recognized that any reference to an "App" here refers to a self-contained program or piece of software designed to fulfill a particular purpose; an application, especially as downloaded by a user to a mobile device. A bid request has an App or a Site object.

The process flow 1000 proceeds to block 1004, including but not limited to operations to identify from the bid request, an auction type, a code for a currency to bid in, a first object containing a custom field describing the bid request, a unique id for the bid request, and a second object describing an advertisement impression associated with the bid request. For example, the bid request may specify an auction type, by a field name (e.g. A) and data type (integer). The server solution operates a first-price auction that runs within the publisher's primary ad server (e.g. 1202 in FIG. 12). That this is not a traditional $1^{st}$ or $2^{nd}$ price auction is indicated by setting the value to 501. In some instances, the bid request may be configured with a field name (e.g. B), with data type that is an array (string), to block advertisers, for example, the list of top-level advertiser domains (e.g., blockeddomain-.com) blocked for this publisher. In some instances, the bid request may use a field name (e.g., C), in the form of an array to designate blocking categories, for example, a list of advertiser categories blocked for a particular publisher in the ad request. In this example, the bid request C field may support one or more IAB categories that may be provided. In most implementations, the bid request is configured to define a field name (e.g. D), with a data type that is an array to specify a single-element array containing a code that specifies the currency accepted for bids. Other examples of what a bid request may specify include: a field name (e.g., Device), with a device object, to specify an object that contains properties that describe the device through which the impression is viewed, such as a particular type of mobile phone. The bid request may also contain field names and data types specifying objects that contain custom fields that describe the bid request, a unique identification for the request, properties that describe the ad impression(s) for which the bid is solicited (participating demand partners determine during implementation if they want to receive multiple impression objects per bid request or a single impression per bid request), properties that describe the website where the ad will be displayed if the bid request is for an impression on a website. The bid request may specify indicators of a test mode in which auctions are not billable. In some instances, the bid request may specify properties that describe the user who is viewing the impression.

The process flow 1000 proceeds to the next block 1006, including but not limited to, example operations that identify an extensions object associated with the bid request. In some instances, an extension object for the bid request may specify an ID for the entity selling the impression(s), provided by the demand partner during implementation of a specific publisher.

The process flow 1000 proceeds to the next block 1008, including but not limited to, operations that identify an imp object from the second object, the imp object includes a banner object and a unique id for the advertisement impression. The imp object is identified by a field name and specifies the data type, whether a banner object, string, pmp.object, or integer and defines properties that describe the display banner ad unit for an impression, a unique ID, special deals eligible for impression or the like. A pmp object is sent for private marketplace deals. In instances where an impression is to be SSL secured, all creative assets that are returned use the HTTPS protocol and not the HTTP protocol. An extensions object for the imp object may be used to identify the ad unit of the impression, to define the full path of the ad unit with a network code and unit name. The extension object may define demand partner-specific ad unit ID provided by the publisher. In some instances, the publishers may define additional free-form values for each imp object that is appended to the extension. This may be a combination of demand-partner specific values and nonspecific values. Each imp object may contain either one banner object, required for banner impressions, or one native object. The banner object may describe that it is supported by one of the API standards or frameworks. If not listed, the system assumes that it is not supported. The banner object may define an array of blocked creative attributes. If no value is specified, all types are allowed.

The process flow 1000 proceeds to the next block 1010, including but not limited to, operations that identify a format object associated with the banner object, the format object specifying a height and width that is permissible for the banner impression. For example, the banner object may define an array of format objects representing the banner sizes permitted, for example the height of the ad space in pixels, or the width of the ad space, in pixels, where the ad of the winning bidder will display. This type of object is used for an impression that permits multiple sizes.

Figure 10B:
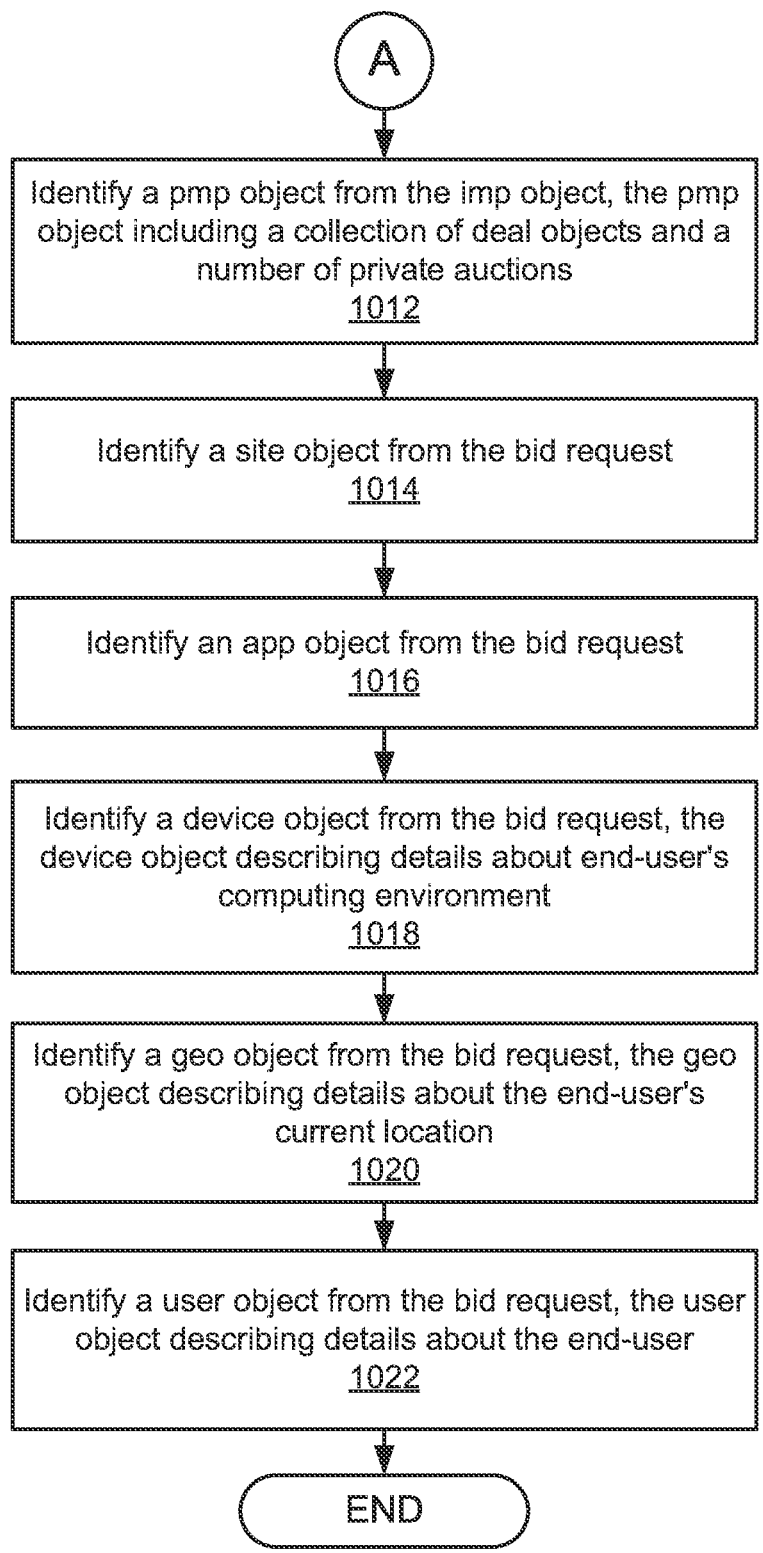
FIG. 10B is a continuation of the flow chart of an example method illustrating the bid request operations of the all-bid embodiment.

From there, the process flow 1000 proceeds through a connector "A" to the next block 1012 in FIG. 10B. Block 1012 illustrates example operations, including but not limited to, identifying a pmp object from the imp object, the pmp object including a collection of deal objects and a number of private auctions. The pmp object defines deals that are eligible for impressions, for example, a collection of deal objects each describing eligible deal terms for an impression opportunity. It may define a private auction, to indicate that a private auction is restricted to certain seats or that all bids are accepted. If the bid request contains any matching objects that do not have an associated deal, then the private auction is set to 0 or it is set to 1 to indicate that only deal bids are accepted. A deal object may define a list of deals eligible for an impression, for example, an auction type to indicate a second price auction or a fixed price auction. It may define the minimum price for the impression in CPM, with the default set to 0.

The process flow 1000 proceeds to the next block 1014, including but not limited to example operations, by which, a site object from the bid request is identified. If the available impression is on a website, the bid request may include a site object to describe the website. A bid request is configured to contain only a single site or app object, and not both. The site object may contain a list of IAB content categories that apply to the site, the site domain configured to map to the domain of the bid request URL, the ID for the site associated with this inventory purchase, to indicate whether the site has been programmed to optimize layout when viewed on mobile devices, the URL of the webpage where the impression will display, and the referring URL that navigated the end user to the current page. In the event the available impression is within a mobile app, the bid request includes the App object to describe the mobile app. A bid request can only contain a single App or site object, and not both.

The process flow 1000 proceeds to the next block 1016, including but not limited to, example operations that identify an app object from the bid request. An App object may be configured to define the unique ID for the app's package, whether Android, iOS, or AppStore ID, the list of IAB content categories for the app, the ID for the app association with the inventory purchase, the name of the app, and the app store URL for this app.

The process flow 1000 proceeds to the next block 1018, including but not limited to, operations that identify a device object from the bid request, the device object configured to specify details about a particular end-user's computing environment. The device object references a geo object and may define the mobile carrier for the user's device, derived from the IP address and expressed by the mobile country code ad mobile network code. It may indicate the detected data connection type for the user's device, the detected device category for the user's device, the hash identifier for the user's device, a do not track flag to allow for private browsing, an MD5 has of the Android ID for the end-user's mobile device, a SHA-1 hash of the Android ID for the end-user's mobile device, properties that describe the geographic location of the user as derived from the device, an ID for advertisers, the ipv4 address closest to a user's device, a two letter code for the user's preferred browsing language on the user's device, or the like. The object may define that if the user's mobile device is set for private browsing, the limit tracking flag is passed. An object may indicate an MD5 hash of the device's MAC address, the SHA-1 hash of the device's MAC address, the manufacturer of the user's device, the model of the user's device, the operating system of the user's device, the version number of the user's operating system, and the HTTP user agent, which typically indicates the user's browser. It should be understood that any one or more of these properties may be defined.

The process flow 1000 proceeds to the next block 1020, including but not limited to example operations that identify a geo object from the bid request, the geo object configured to specify details about the end user's current location. The geo object provides details on the user's current location (in relation to the device object) or its primary location (via the user's object).

The process flow 1000 proceeds to the next block 1022, including but not limited to, example operations that identify a user object configured to specify details about the end user. In some instances the user object may reference the geo object. The user object may define a demand partner's ID provided via the mechanism described in the user syncing section.

Figure 11:
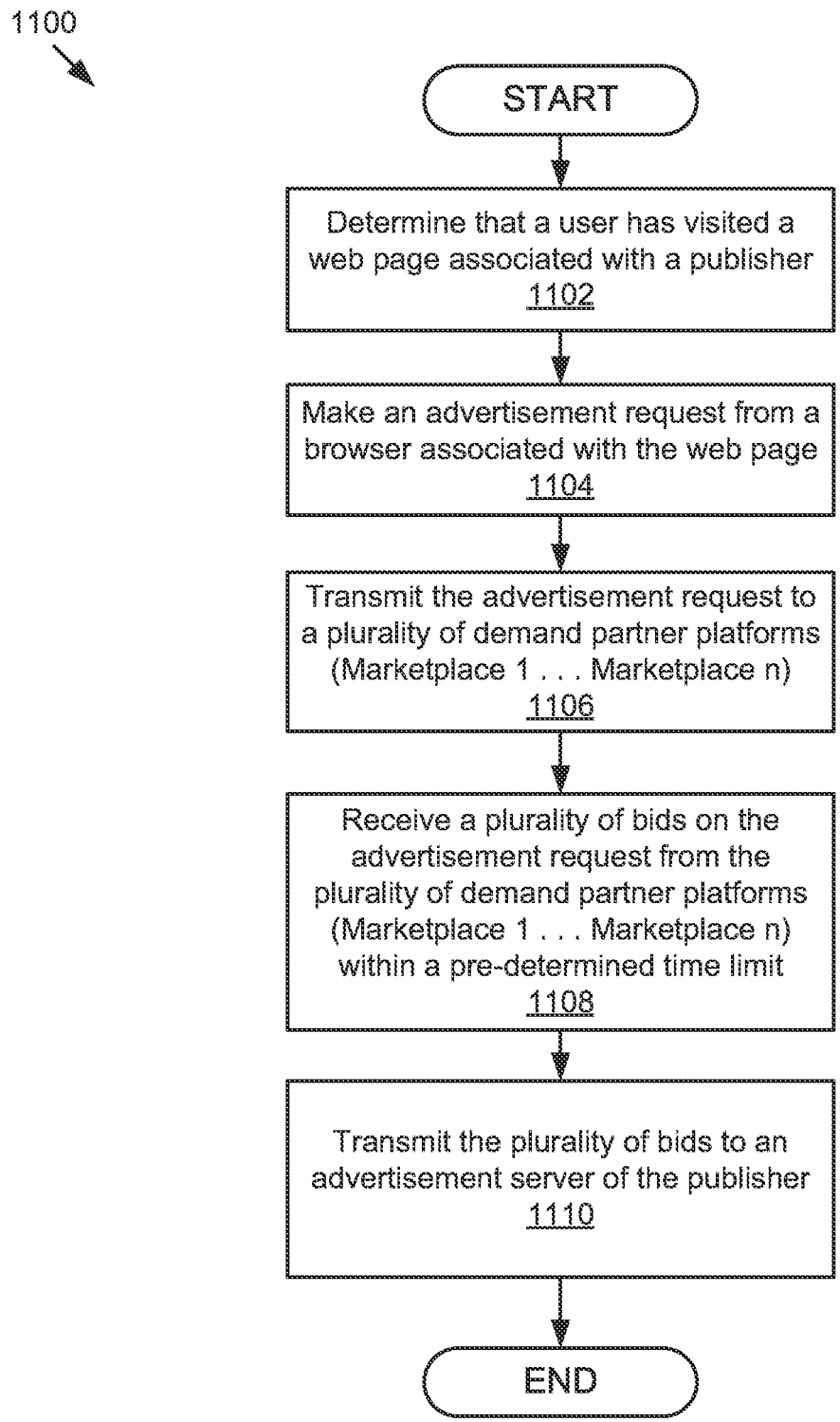
FIG. 11 is a flow chart of an example method in accordance with the all-bid embodiment, illustrating the bid request process in the all-bids embodiment.
Figure 12:
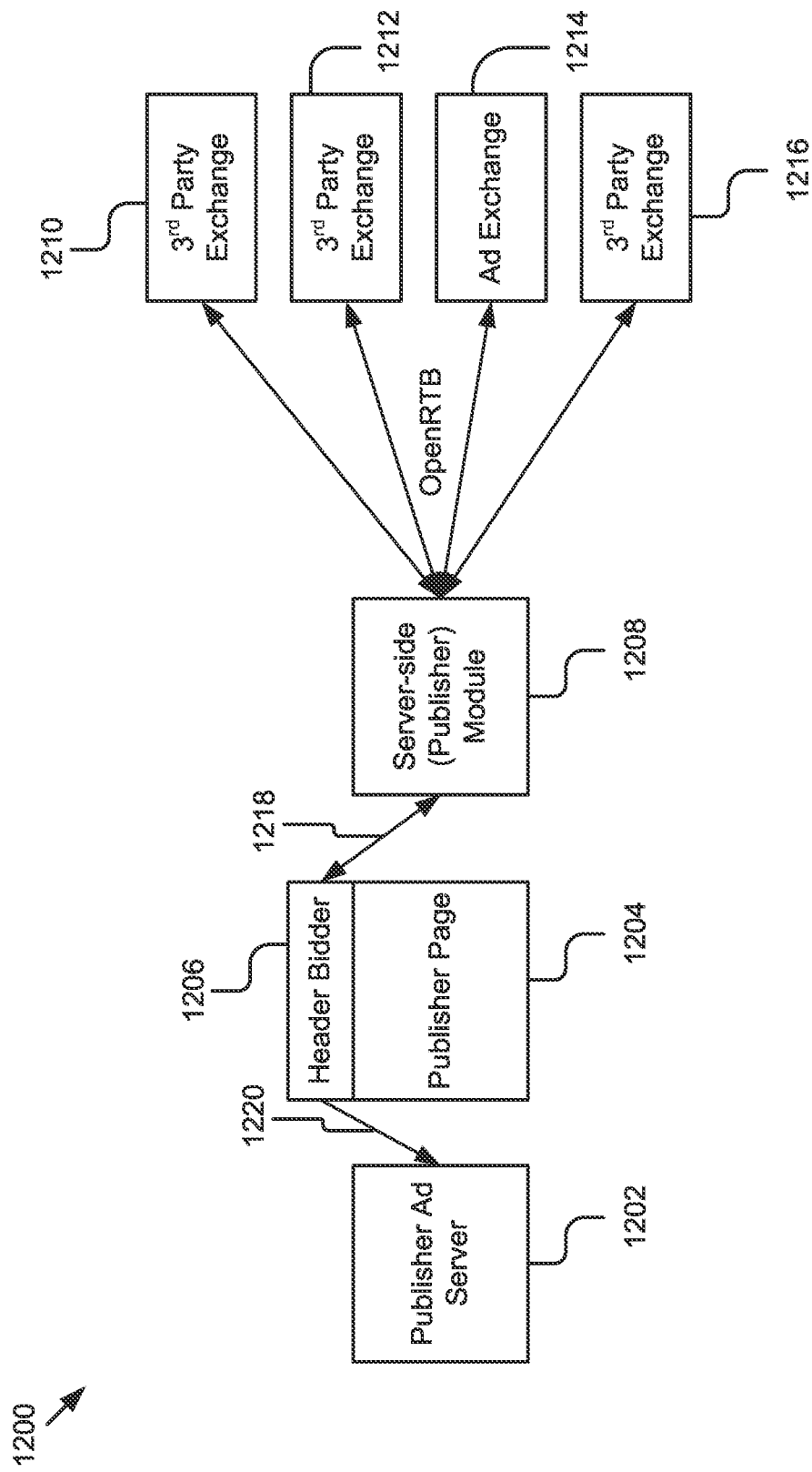
FIG. 12 is a flow chart of the enhanced server-side solution in accordance with some embodiments of the system architecture that provide transparency to all the participants in this environment.

Referring now to FIGS. 11 and 12 in combination, the system and process for the server-side solution that provides transparency is described in greater detail. The process flow 1100 begins and proceeds to block 1102, including but not limited to, example operations that determine that a user has visited a web page associated with a publisher. The process flow 1100 proceeds to the next block 1104, including but not limited to, example operations that make an advertisement request from a browser associated with the web page. In this instance, the bidding algorithms enable a single call from the browser, eliminating latency caused by multiple calls. The process flow 1100 proceeds to the next block 1106, including but not limited to, example operations that can transmit the advertisement request to a plurality of demand partner platforms. In some implementations, the advertisement request is transmitted to a server-side architecture layer that is a neutral and fully transparent layer that makes parallel calls to all partners. The process flow 1100 proceeds to the next block 1108, including but not limited to, example operations that receive a plurality of bids on the advertisement request from the plurality of demand partner platforms (e.g., 1210, 1212, 1214, and 1216 in FIG. 12) with a pre-determined time limit. In this instance, highly efficient server-to-server connections are enabled based on OpenRTB protocols that enable all partners to simultaneously bid on the ad request. The process flow 1100 proceeds to the next block 1110, including but not limited to example operations that can transmit the plurality of bids to an advertisement server of the publisher. In this instance, the server-side architecture layer (e.g., 1208 in FIG. 12) relies on the publisher's ad server to run the decision logic, as a result providing equal opportunity to all the participants. All the participants send their bids back to the server-side architecture layer within a designated cutoff time limit. The server-side architecture layer maintains full transparency to ensure fair competition and maximize participation.

FIG. 12 illustrates the server-side solution in accordance with the present invention that allows publishers to solicit pricing in the online advertising environment, from multiple exchanges and passes them into their primary ad server in order to participate in its ad selection logic and process. With this server-side solution, the open RTB may serve as a messaging protocol without conducting and clearing an auction. Moreover, header bidding technology is easily integrated with the publisher's ad server (e.g., 1202 in FIG. 12). By using this technology, publishers may add, pause, or remove exchanges, without making any changes to their pages. FIG. 12 illustrates the server-side architecture generally by reference numeral 1200, which includes a publisher add server 1202 configured to display publisher web pages, including example publisher page 1204 illustrated with a header bidder 1206. Arrow 1220 connecting the header bidder 1206 to the publisher ad server 1202 illustrates data flow from the header bidder 1206 to the publisher add server 1202. The bi-directional arrow 1218, between the header bidder 1206 and the server-side module/architecture layer (e.g. for publishers) 1208, illustrates flow of data between the two. Bi-directional arrows between the server-side module/architecture layer 1208 and $3^{rd}$ party exchanges 1210, 1212, and 1216 and Ad Exchange 1214, through open RTB illustrate data flow among them. A bid response object in this environment is also configured with a field name, designation of data type, and description. In some instances, a bid response may be generated for tracking purposes and to specify the bid currency, using ISO-4217 alpha codes, with the default set to "USD." In other instances, a bid response may be configured with a unique ID for a particular auction and additional details of the bid for the current impression. As one example a BidResponse.seatbid may be a collection of Seatbid objects. Each SeatBid object has an array with at least one SeatBid object, which has the list of bids for the impression. Each may define an array of bid objects with properties that describe the bid for the current impression. In some instances, each may have an ID of the buyer seat (e.g., advertiser, agency) on whose behalf this bid is made. Each SeatBid object contains at least one Bid object that define a bid for the impression. This may use a string containing the markup for the proposed ad creative. It may contain HTML that will be displayed. This may provide a list of advertiser domains for a block list checking, accepting a full landing page URL. This list may provide IAB content categories for the ad or the unique buyer-specific ID for the creative, which is useful for reporting content issues or defects. This may provide a unique ID for the prearranged deal associated with the bid, an object containing properties that describe custom fields related to this Bid object or advisory on the number of seconds the bidder is willing to wait from the auction occurrence to the actual impression. This may include the ID for the corresponding Bid object, the ID of the imp object to which this bid applies, and the CPM bid price.

To provide full transparency of the supply that is being served, the server-side module/architecture layer (e.g. for publishers) 1208, uses ad unit mapping to expose a JavaScript API for publishers to pass specific ad unit information that is essential for optimal targeting, reporting, and troubleshooting by the demand partners. The server-side module/architecture layer (e.g. for publishers) 1208 offers two ways for publishers to communicate that information to the various demand partners. Either of two designators may be sent. A first designator that may be used (e.g., adunitpath) provides the full path of the ad unit with the network code and unit name configured by the primary ad server. The second designator that may be used (e.g. adunitid) indicates the demand partner-specific ad unit ID.

In addition, the Demand Partners do not have their tags directly on the publisher's web page, therefore, syncing is accomplished by alternative methods. In some embodiments, to identify a user with certainty, the demand partners may either access their cookie, either by JavaScript or by http request header. The Exchange Partners can implement two mechanisms based on their needs. According to a first mechanism, an Exchange Partner implements a JavaScript resource that accepts a callback as a query-string parameter that is invoked. When the script loads, it invokes the function named in a predetermined parameter with the partner's user ID response. According to a second mechanism, a library may be provided, for example, a JavaScript library, that exposes a function that is invoked to retrieve the partner's user ID response. In either case, the response has a JavaScript object with two properties. In order to reduce latency, the server-side module/architecture layer (e.g. for publishers) 1208 may cache partner user IDs in the client device when possible. If the partners want to specify a TTL (time-to-live, i.e., how long the value may be cached) for their user ID, they do so, by using a "ttl" attribute of the response object. If no TTL is specified, the value is cached in 60 minutes. In addition, to protect the user experience, a timeout is applied to the user synching step. If a demand partner does not meet the timeout limit, the request proceeds without that partner's user ID, though it may be cached for future use. As the final selection is made by the publisher's ad server, in order to track possible wins, the demand partner may add their impression beacon at the end of the ad markup in the bid response, within a designated field.

The server-side module/architecture layer (e.g. for publishers) 1208 is configured to seamlessly support private deals from participating demand partners. It is configured to accept a Deal ID in a bid response even in instances that a Deal ID is not passed in the originating bid request. The server-side module/architecture layer (e.g. for publishers) 1208 is configured to collect all relevant available data from the web page and pass it in the bid request. Based on this data, a demand partner may qualify for private deals when soliciting bids from the buyers and return a Deal ID in the bid response to the server-side module/architecture layer (e.g. for publishers) 1208, when one of these buyers wins a private marketplace deal. The server-side module/architecture layer (e.g. for publishers) 1208 passes the response to the publisher's primary ad server together with the Deal ID where it is prioritized based on the relevant deal line item.

The Demand Partners are integrated by identifying and providing RTB end points for bid solicitation, by region in the event relevant, by identifying and providing end points for user syncing, by determining if a demand partner wants to receive bid requests for users whose ID has not been synced, by determining during integration, whether a particular demand partner wants to receive multiple impression objects per bid request or a single impression per bid request. For test integration in a sandbox environment, a URL is provided by an account manager of the exchange platform. Other features critical for seamless integration in the architecture is to provide a unique ID to the exchange platform, to identify the entity selling the impression, during the implementation of a specific publisher, to provide ad unit IDs to the publisher, to pass using JavaScript API, as an alternative to full ad unit path as configured in a primary ad server.

Figure 13:
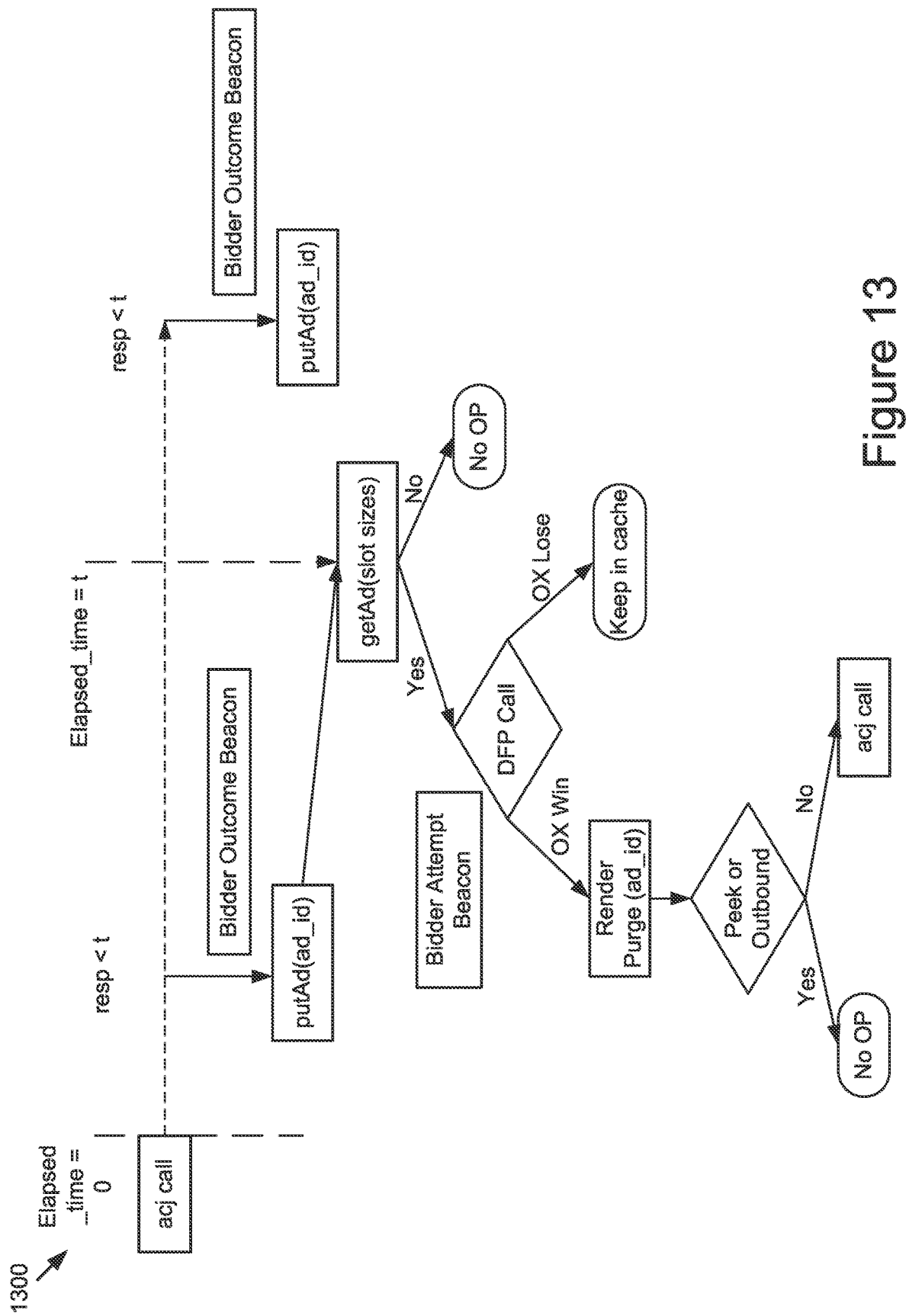
FIG. 13 is a block diagram of an example method illustrating the operations of the zero-latency feature and its use in retrieving ads.

Referring now to FIG. 13, further details are described on how the client-side code uses the zero-latency bidder cache to obtain advertisements within a timeline implemented by some embodiments. The timeline begins at zero and the designator "t" is used to represent a predetermined time. An instruction (e.g., putAd) may be configured to put an advertisement creative in the cache for a particular advertisement that is identified. Another instruction (e.g. getAd) may retrieve the highest priced matching creative from the cache. Yet another instruction (e.g., purgeAd) may be used to erase advertisement identifications from the cache. Another instruction (e.g., peek) may be used to check for ad size in the cache. In operation, a bidder-enabled site is requested by any particular user's browser. As part of the page load, the Exchange (OX) 'jstag' is loaded. The 'jstag' proxies the 'mapped' zones and identifies the Ad Server (e.g., DFP) zones to be bid on. The result of the mapping process is an Exchange adunit ID. From this point, the operations described only relate to a single slot that needs to be filled. The operations check to see if an advertisement for this slot is received from the cache with an indication of the specified 'timeout'. The candidate advertisement is determined by considering the list of sizes defined by the slot by the publisher. In scenarios where there are multiple slots on the page with the same 'size' we ignore various processes, with the cache object passing through a selection process. This process includes identifying stale advertisements, purging stale/corrupt advertisements, ensuring that the cache has not been tampered with etc. The parameters for the selection include the list of sizes the slot supports. The selection logic in the cache uses the local storage for caching the ad responses. This feature works only for browsers that support local storage. Each domain has its own cache. The domains 'Site.com' and 'A.Site.com' may be configured with separate cache memories. Domains 'SiteA.com' and 'SiteB.com' may be configured with separate caches. This implementation supports advertisement chain rendering technology.

If an advertisement is retrieved, the zero-latency bidder competes with the Ad Server (e.g., a DFP) for this slot using the bid/ad. If an advertisement is not retrieved, the zero-latency bidder does not compete with the Ad Server (e.g., DFP) for this slot using the bid/ad. In the event the zero-latency bidder beats the Ad Server (e.g., DFP) for the slot, it renders the advertisement and purges the advertisement from the cache and requests an advertisement for this slot from the exchange. The parameters for this request are the adunit id and the list of sizes defined for this slot by the publisher for this slot. The response from the exchange is stored in the cache. In the event the zero-latency bidder is beaten by the Ad Server (e.g., DFP) for the slot, the ad is 'put' back in the cache. With this workflow, the bidder stores 'n' ad responses, where 'n' is the number of the 'mapped' slots. The publisher specified 'timeout' is implicitly used by the process that obtains an ad from the cache. In some instance, the task of fetching an ad from the cache triggers a request to the exchange.

Figure 14:
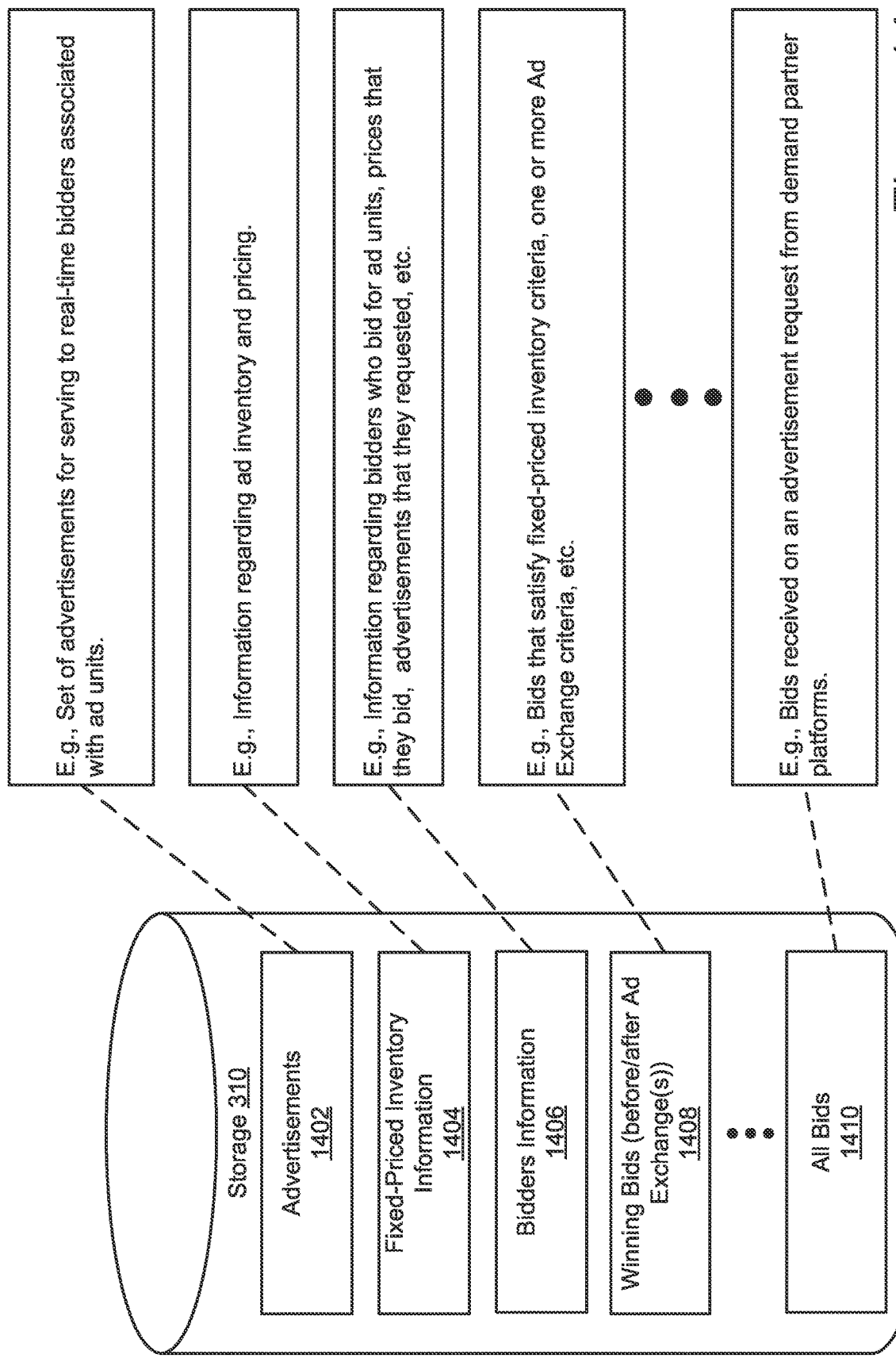
FIG. 14 is a block diagram illustrating data storage configurations in accordance with some embodiments of the present invention.

Referring now to FIG. 14, the data storage 310 is illustrated in greater detail. The storage 310 has memory sectors for storing advertisements 1402, Fixed-Price Inventory Information 1404, Bidders Information 1406, Winning Bids 1408, and All Bids 1410, among other data. As examples, the memory sector 1402 may store a set of advertisements for serving to real-time bidders associated with advertisement units. The memory sector 1404 for Fixed-Priced Inventory Information may include information on advertisement inventory and pricing. The memory sector 1406 for Bidders Information may include as examples, information regarding bidders who bid for advertisement units, prices that the bid, advertisements that they requested, etc. The memory sector 1408 for Winning Bids (before or after one or more Ad Exchanges analysis) may include as examples, bids that satisfy fixed-priced inventory criteria, bids that satisfy one or more Ad Exchange criteria, etc. The memory sector 1410 may store information on all bids. The examples illustrated here are only by way of example and it should be recognized that additional memory sections with additional data may be stored as needed or desired, depending upon the architectural implementations.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment.

What is claimed is:

1. A method, comprising:

executing instructions stored in a memory of a server operatively coupled to an advertisement-serving engine configured to serve advertising impressions upon request, the instructions executing over a network and embedding one or more advertisement impressions in real time in one or more advertisement spaces that appear in viewable content of a publisher server in an instant that the viewable content is rendered by a pixel server, on a computing device of an end user, in a viewable format, triggering an advertisement-request instruction including an executable code, relating to the one or more advertisement spaces, from a header section within the viewable content;

receiving the advertisement-request instruction initiated when the pixel server renders the viewable content and the executable code from the header, by the server, and in response, executing an action that launches multiple parallel advertisement-request queries seeking advertisement bids with an offer to fill the one or more advertisement spaces in the viewable content;

sending the multiple parallel advertisement-request queries with a bid request to a plurality of demand-partner platforms operatively coupled to the server, the plurality of demand-partner platforms integrating with the server via the network;

identifying select unique data in the bid request for the one or more advertisement spaces initiated by the multiple parallel advertisement-request queries, including, at least: 1) an auction type, 2) a code for a bidding currency, 3) a first object containing a field defining the bid request, 4) a unique identification corresponding to the bid request, and 5) a second object describing an advertisement impression associated with the bid request;

receiving a plurality of responsive bids to the bid request for the one or more advertisement spaces from the demand-partner platforms at the server or an associated server for enabling a bid selection from the plurality of responsive bids received, and selecting a responsive bid that meets a minimum threshold of at least historical pricing information and user segmentation information;

transmitting the select unique data in the plurality of responsive bids to an advertising-serving system to enable serving select advertisement impressions to each of the one or more advertisement spaces and creating a pixel for each of the one or more advertisement spaces and storing aggregated responsive bid data; and tracking the select advertisement impressions and a particular demand-partner platform providing the select advertisement impressions, and mapping each particular advertisement space from the one or more advertisement spaces in which each select advertisement impression is embedded to the particular demand-partner platform providing the select advertisement impression.

2. The method of claim 1, further comprising:
providing an object configured to download an interchange format specific to the viewable content, the interchange format containing a mapping between each advertisement space and the select unique data identifying a corresponding demand-partner platform, the object specifying a size of each advertisement space.

3. The method of claim 1, further comprising:
refilling a web storage with more advertisement impressions, every time the select advertisement impressions are served.

4. The method of claim 1, triggering the action by the executable code rendered in the header in the viewable content to begin transmitting the multiple parallel advertisement-request queries to the demand-partner platforms, wherein each of the demand-partner platforms serves as a marketplace.

5. The method of claim 1, further comprising:
refreshing a web storage after a threshold time period lapses.

6. The method of claim 5, wherein identifying select unique data in the bid request, includes: 1) the auction type, 2) the code for currency to bid in, 3) the first object containing a field defining the bid request, 4) the unique identification for the bid request, and 5) the second object describing an advertisement impression associated with the bid request.

7. The method of claim 1, further comprising:
identifying, a flag that enables and disables functionalities of a zero-latency bidder engine coupled to the server.

8. The method of claim 1, further comprising:
identifying a banner object and a format object associated with the banner object, wherein the format object describes an allowed height and width for a banner impression;
identifying a site object from the bid request;
identifying an application object from the bid request;
identifying a device object from the bid request, wherein the device object describes detail data about a computing environment for the end user;
identifying a geographic object from the bid request, wherein the geographic object describes detail data about a current location for the end user; and
identifying a user object from the bid request, wherein the user object describes detail data about the end user.

9. The method of claim 8, further comprising:
identifying, for the bid request, the site object, the device object to indicate the computing environment for the end user, the geographic object to indicate the current location for the computing device of the end user, and the user object to describe details about the computing device of the end user.

10. An advertisement-embedding system operatively coupled, by a network, to publisher content rendering on multiple user devices, comprising:
a processor;
memory storing executable code for embedding advertisements in the publisher content in an instant that the publisher content variously renders on the multiple user devices;
the processor tracking the publisher content as it renders on a particular user device of the multiple user devices, and executing executable code in a header within a publisher page with the publisher content, the executable code in the header requesting an action in an instant that the executable code executes and initiating multiple parallel request queries for advertisement bids for an advertisement slot in the publisher content from a browser associated with the publisher page when the particular user device accesses the publisher page and the multiple parallel request queries transmitted to a plurality of different demand-partner platforms via an interface configured to receive a plurality of responsive bids from the plurality of demand-partner platforms;
the processor further enabling an advertisement bid selection based on a first data set representative of an auction type, a code for a bid currency, a first object containing a field defining each advertisement bid, a unique identification for each advertisement bid, and a second object describing an advertisement impression associated with each advertisement bid, a final advertisement bid selection communicated to an advertisement server with the unique identification for the selected final advertisement bid to begin serving the advertisement impression associated with the selected final advertisement bid to the advertisement slot in the publisher content; and
an interchange format containing a mapping between the advertisement slot and an identification identifying a real-time bidder at a demand-partner platform from the plurality of demand-partner platforms that provided the advertisement impression in response to the selected final advertisement bid.

11. The system of claim 10, further comprising an object configured to download the interchange format specific for a publisher site associated with the publisher page containing a mapping between the advertisement slot and the identification identifying the real-time bidder.

12. The system of claim 11, wherein the object further contains information on a specific size of the advertisement slot and callback functions associated with the advertisement slot.

13. The system of claim 12, wherein the plurality of demand-partner platforms includes third party exchanges and an exchange.

14. The system of claim 13, wherein the bid request includes the multiple parallel request queries sent to multiple real time bidders at the plurality of demand-partner platforms to receive multiple bids.

15. The system of claim 14, wherein real-time bidding via the interface serves as a messaging protocol.

16. The system of claim 15, wherein bid selection is based on said first data set and a second data set representative of at least one more of the auction type, the code for currency to bid in, the first object containing a field defining the bid request, the unique identification for the bid request, and the second object describing the advertisement impression associated with the bid request.

17. The system of claim 16, wherein the advertisement bid further comprises:
the auction type, the code for currency to bid in, the first object containing a field defining the bid request, the unique identification for the bid request, and the second object describing the advertisement impression associated with the bid request.

18. The system of claim 17, further comprising:
extension requests associated with the bid request.

19. The system of claim 18, further comprising:
a banner object and a unique identification for the advertisement impression.

20. The system of claim 19, further comprising:
at least one of the following for the bid request, including a 1) site object, 2) a device object to indicate a computing environment for an end user of the particular user device, 3) a geographic object to indicate a current location for the particular user device, and 4) a user object to describe details about the particular user device.

* * * * *